United States Patent
Ohgaru et al.

(10) Patent No.: US 7,505,099 B2
(45) Date of Patent: Mar. 17, 2009

(54) OPTICAL RESIN FILM AND POLARIZING PLATE AND LIQUID CRYSTAL DISPLAY USING SAME

(75) Inventors: Ikuko Ohgaru, Minami-Ashigara (JP); Susumu Sugiyama, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 357 days.

(21) Appl. No.: 11/504,622

(22) Filed: Aug. 16, 2006

(65) Prior Publication Data

US 2007/0040962 A1 Feb. 22, 2007

(30) Foreign Application Priority Data

Aug. 17, 2005 (JP) .......................... P2005-236752

(51) Int. Cl.
*G02F 1/1335* (2006.01)
*G02B 5/30* (2006.01)

(52) U.S. Cl. ...................... 349/117; 359/500
(58) Field of Classification Search ................ 349/117; 359/500
See application file for complete search history.

(56) References Cited

U.S. PATENT DOCUMENTS

2004/0241344 A1 * 12/2004 Kawanishi et al. ........... 428/1.1

FOREIGN PATENT DOCUMENTS

| JP | 3027805 B2 | 1/2000 |
| JP | 3273046 B2 | 1/2002 |
| JP | 3330574 B2 | 7/2002 |

* cited by examiner

*Primary Examiner*—Jerry T Rahll
(74) *Attorney, Agent, or Firm*—Buchanan Ingersoll & Rooney PC

(57) ABSTRACT

An optical resin film is provided and fulfills the following formulae (A) to (D) concerning retardations and is formed by using a polymer or a copolymer of a cycloolefin compound:

$$0.1 < Re(450)/Re(550) < 0.95; \quad (A)$$

$$1.03 < Re(650)/Re(550) < 1.93; \quad (B)$$

$$0.4 < (Re(450)/Rth(450))/(Re(550)/Rth(550)) < 0.95; \text{ and} \quad (C)$$

$$1.05 < (Re(650)/Rth(650))/(Re(550)/Rth(550)) < 1.9. \quad (D)$$

11 Claims, 3 Drawing Sheets

RELATION BETWEEN SLOW AXIS OF FILM AND RE/RTH
(AZIMUTH ANGLE = 45°, POLAR ANGLE = 34°)

OPTICAL RESIN FILM AND POLARIZING PLATE AND LIQUID CRYSTAL DISPLAY USING SAME

FIELD OF THE INVENTION

The invention relates to an optical resin film and a polarizing plate and a liquid crystal display using the same.

BACKGROUND OF THE INVENTION

Liquid crystal displays have been widely used in monitors of personal computers and mobile telephones, TV sets and so on because of having a number of merits such as running at low voltage, requiring little electricity and being available in downsized and thinned modes. These liquid crystal displays have been proposed in various modes depending on the aligned states of liquid crystal molecules in liquid crystal cells. Among all, the TN mode, wherein liquid crystal molecules are aligned at a twist angle of about 90° from the lower substrate of a liquid crystal cell toward the upper substrate, has been mainly employed.

A liquid crystal display is usually made up of a liquid crystal cell, an optically compensatory sheet and a polarizer. As the optically compensatory sheet, which is employed to relieve image coloration or enlarge viewing angle, use has been made of films obtained by coating a stretched birefringent film or a transparent film with liquid crystals. For example, Patent Document 1 discloses a technique wherein an optically compensatory sheet, which is obtained by coating discotic liquid crystals on a triacetylcellulose film and then fixing by orientation, is applied to a TN mode liquid crystal cell to thereby enlarge the viewing angle. In a liquid crystal display for a wide-screen TV likely watched from various angles, however, accurate viewing angle-dependency is required and this requirement cannot be fulfilled by using the techniques as discussed above. Thus, studies have been made on liquid crystal displays in modes different from the TN mode, for example, the IPS (in-plane switching) mode, the OCB (optically compensatory bend) mode and the VA (vertically aligned) mode. Among all, the VA mode has attracted public attention as a liquid crystal display for TV since it establishes a high contrast and can be produced at a relatively high yield.

However, the VA mode suffers from a problem that though it provides almost complete black display in the normal line direction of the panel, light leakage arises in observing the panel from an angle and thus the viewing angle is narrowed. To solve this problem, there has been proposed a method of relieving the light leakage by the combined use of a first phase contrast plat having a positive refractive index anisotropy (nx>ny=nz) with a second phase contrast plat having a negative refractive index anisotropy (nx=ny>nz) (see, for example, Japanese Patent No. 3027805). It has been also proposed to improve the viewing angle characteristics of a VA mode liquid crystal display by using an optically biaxial phase contrast plate (nx>ny>nz) (see, for example, Japanese Patent No. 3330574), wherein nx, ny and nz respectively stand for the refractive indexes in the X-axis, Y-axis and Z-axis directions. The X-axis direction corresponds to the direction showing the maximum refractive index in the in-plane direction of the phase contrast plate, the Y-axis direction corresponds to the direction perpendicular to the X-axis direction in plane, and the Z-axis direction corresponds to the thickness direction perpendicular to the X-axis and Y-axis directions as described above.

By these methods, however, light leakage within a certain wavelength range (for example, green light at around 550 nm) can be exclusively relieved and no attention is paid to light leakage in other wavelength ranges (for example, blue light at around 450 n, or red light at around 650 nm). Therefore, so-called color shift (i.e., coloration in blue or red in the case of, for example, looking black display at an angle) cannot be improved thereby.

To obtain a definite image in vivid colors, a phase plate for liquid crystal displays should have a birefringent layer being optically even on the whole face and show no change in the optical characteristics due to changes in temperature or humidity. As materials for these phase plates, there have been proposed to use thermoplastic resin films as reported in Japanese Patent No. 3273046.

However, color shift as discussed above cannot be improved even by using such films as reported in Japanese Patent No. 3273046.

SUMMARY OF THE INVENTION

An object of an illustrative, non-limiting embodiment of the invention is to provide an optical resin film which shows no change in the optical characteristics due to changes in temperature or humidity, has a high contrast ratio over a broad range and can regulate color shift, and a polarizing plate and a liquid crystal display by using the same.

An aspect of the invention is as follows.

(1) An optical resin film formed from at least one of a polymer and copolymer of a cycloolefin compound, the optical resin film having retardations satisfying formulae (A) to (D):

$$0.1 < Re(450)/Re(550) < 0.95 \tag{A}$$

$$1.03 < Re(650)/Re(550) < 1.93 \tag{B}$$

$$0.4 < (Re(450)/Rth(450)/Re(550)/Rth(550)) < 0.95 \tag{C}$$

$$1.05 < (Re(650)/Rth(650)/Re(550)/Rth(550)) < 1.9 \tag{D}$$

wherein $Re(\lambda)$ indicates an in-plane retardation by nm of the optical resin film with respect to light having a wavelength of $\lambda$ nm; and $Rth(\lambda)$ indicates a thickness-direction retardation by nm of the optical resin film with respect to the light having the wavelength of $\lambda$ nm.

(2) An optical resin film as described in the above (1), which is a stretched optical resin film. which That is, the optical resin film in an aspect of the invention may has been formed by stretching the optical resin film.

(3) An optical resin film as described in the above (2), which is an optical resin film freely uniaxially stretched at an angle of −10 to 10° to a traveling direction (longitudinal direction) of the optical resin film. That is, in an aspect of the invention, the stretching may be conducted by free uniaxially stretching at an angle of −10 to 10° to a traveling direction of the optical resin film.

(4) An optical resin film as described in the above (2), which is an optical resin film at an angle of 80 to 100° to a traveling direction of the optical resin film and relaxes in a traveling direction of the optical resin film. That is, in an aspect of the invention, the stretching may be conducted at an angle of 80 to 100° to the traveling direction of the optical resin film and then the film is relieved (or relaxed) in the traveling direction.

(5) An optical resin film as described in any one of the above (1) to (4), which has an optically anisotropic layer. The optically anisotropic layer may be stacked on at least one face of the optical resin film.

(6) An optical resin film as described in any one of the above (1) to (5), which has Re(590) and Rth(590) satisfying formulae (I) and (II):

$$20\ nm \leq Re(590) \leq 200\ nm \quad (I)$$

$$70\ nm \leq Rth(590) \leq 400\ nm. \quad (II)$$

(7) An optical resin film as described in any one of the above (1) to (6), which has a film thickness of from 10 to 150 μm.
(8) A polarizing plate comprising: at least one optical resin film as described in any one of the above (1) to (7); and a polarizer.
(9) A polarizing plate as described in the above (8), which has at least one layer of a hard coat layer, an antiglare layer and an antireflection layer on a surface of the polarizing plate.
(10) A liquid crystal display comprising: an optical resin film as described in any one of the above (1) to (7) or a polarizing plate as described in the above (8) or (9).
(11) A VA mode liquid crystal display comprising: an optical resin film as described in any one of the above (1) to (7) or a polarizing plate as described in the above (8) or (9).

The Re(λ) as used herein is measured by making light having a wavelength of λ nm incident into the normal line direction in KOBRA 21ADH (manufactured by Oji Science Instruments). The Rth(λ) is computed by KOBRA 21 ADH on the basis of retardation values, as measured in three directions in total, of the foregoing Re(λ), a retardation value as measured by making light having a wavelength of λ nm incident from a direction inclined by +40° against the normal line direction of the film while making the in-plane slow axis (judged by KOBRA 21ADH) serve as a tilt axis (rotational axis), and a retardation value as measured by making light having a wavelength of λ nm incident from a direction inclined by −40° against the normal line direction of the film while making the in-plane slow axis serve as a tilt axis. Here, as hypothetical values of average refractive index, values described in *Polymer Handbook* (John Wiley & Sons, Inc.) and various catalogues of optical films can be employed. When an average refractive index value is not known, it can be measured by an Abbe's refractometer. Average refractive index values of major optical films are exemplified below: cellulose acylate (1.48), cycloolefin polymer (1.52), polycarbonate (1.59), polymethyl methacrylate (1.49), polystyrene (1.59). By inputting a hypothetical value of the average refractive index and a film thickness, KOBRA 21ADH computes nx, ny and nz. From the thus computed nx, ny and nz, Nz=(nx−nz)/(nx/ny) is computed.

In an aspect of the present invention that has been completed based on the findings obtained as the results of intensive studies by the inventors, the in-plane retardation and the thickness-direction retardation of an optical resin film are independently controlled and the optically optimum values thereof are determined by selecting appropriate materials and production methods so as to enable viewing angle compensation at almost every wavelength in the black display of a liquid crystal cell, in particular, a VA mode liquid crystal cell. As a result, the liquid crystal display of the invention shows relieved light leakage in an oblique direction and largely improved viewing angle contrast. In the liquid crystal display of the invention, furthermore, light leakage in an oblique direction in black display can be suppressed almost all over the visible light range. Thus, color-shift depending on viewing angle in black display is largely improved. According to an aspect of the invention, therefore, it is possible to provide an optical resin film which suffers from no change in optical characteristics due to changes in temperature or humidity and shows a high contrast ratio over a broad range and the color shift of which can be regulated, and a polarizing plate and a liquid crystal display using the same.

DETAILED DESCRIPTION OF THE INVENTION

Figure 1:
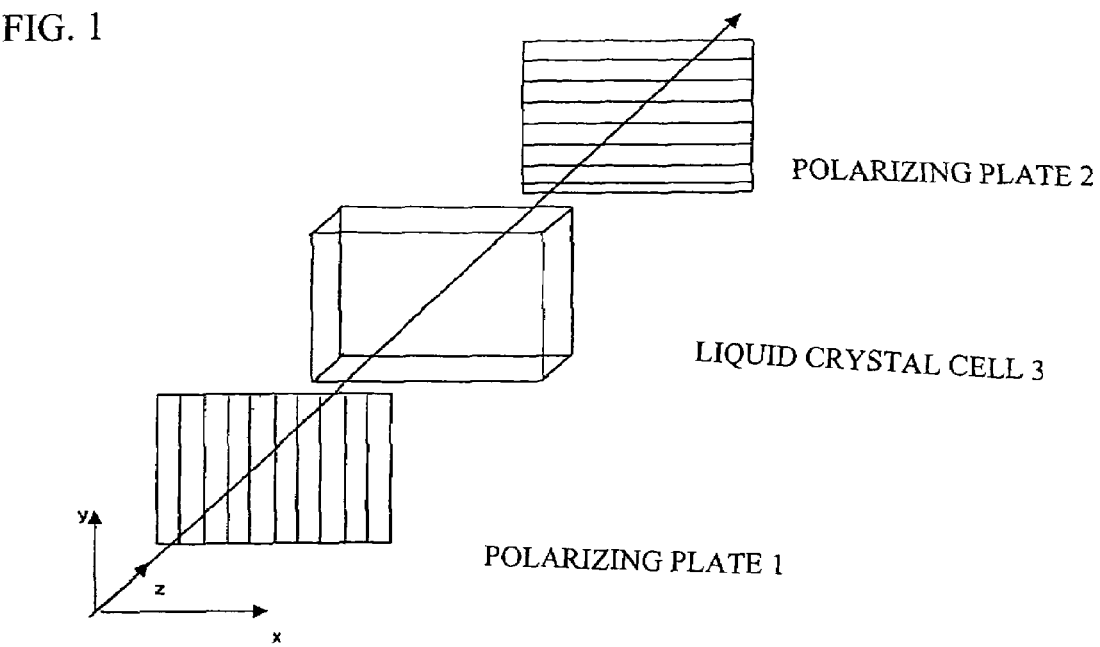
FIG. 1 is a schematic view illustrating an example of a VA mode liquid crystal display in the background art.

Now, the function of the invention will be described by referring to drawings. FIG. 1 is a model view showing a VA mode liquid crystal display of a general type. The VA mode liquid crystal display has a liquid crystal cell 3 having a liquid crystal layer wherein liquid crystal molecules are aligned perpendicularly to the substrate face when voltage is not applied (i.e., in black display), and a polarizing plate 1 and another polarizing plate 2 holding the liquid crystal cell 3 sandwiched between them which are located so that the transmission axes thereof (represented by stripes in FIG. 1) are at right angles to each other. In FIG. 1, light enters from the polarizing plate 1 side. When light traveling in the normal line direction (i.e., the z axis direction) enters while no voltage is applied, the light passes through the polarizing plate 1 and then passes through the liquid crystal cell 3 while maintaining in the linearly polarized state. Subsequently, the light is completely blocked by the polarizing plate 2. Thus, an image with a high contrast can be displayed.

Figure 2:
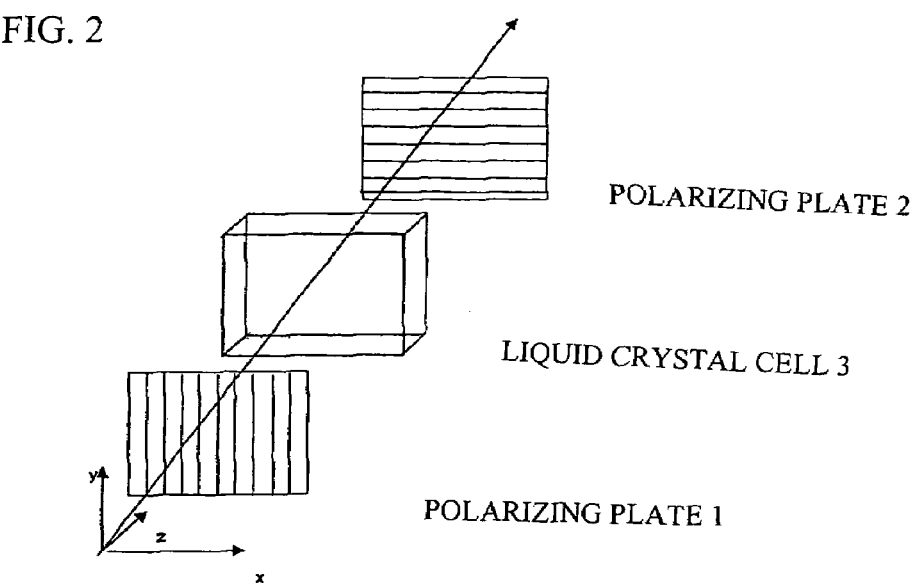
FIG. 2 is a schematic view illustrating another example of a VA mode liquid crystal display in the background art.

However, an oblique incident light, as in FIG. 2, would travel in a different manner. In the case where light enters from not the z axis direction but an oblique direction (i.e., a direction at an angle from the polarization directions of the polarizing plates 1 and 2, so-called OFF AXIS), the incident light is affected by the retardation in the oblique direction while it passes through the perpendicularly aligned liquid crystal layer of the liquid crystal cell 3 and thus the polarization state is changed. Further, the intersections of the apparent transmission axes of the polarizing plate 1 and the polarizing plate 2 are shifted from right angles. Due to these two factors, the incident light from the oblique direction (OFF AXIS) is not completely blocked by the polarizing plate 2 and, in its turn, there arises light leakage in black display, thereby lowering the contrast.

Next, the polar angle and the azimuth angle will be defined. The polar angle means a tilt angle from the normal line direction in the film plane, i.e., the z axis in FIGS. 1 and 2. For example, the normal line direction in the film plane means the direction of a polar angle of 0°. The azimuth angle means a direction determined by rotating clockwise on the basis of the positive direction of the x axis. For example, the positive direction of the x axis means the direction of an azimuth angle of 0° while the positive direction of the y axis means the direction of an azimuth angle of 90°. The oblique direction in OFF AXIS as discussed above mainly means the case wherein the polar angle is not 0° and the azimuth angle is 45°, 135°, 225° or 315°.

Figure 3:
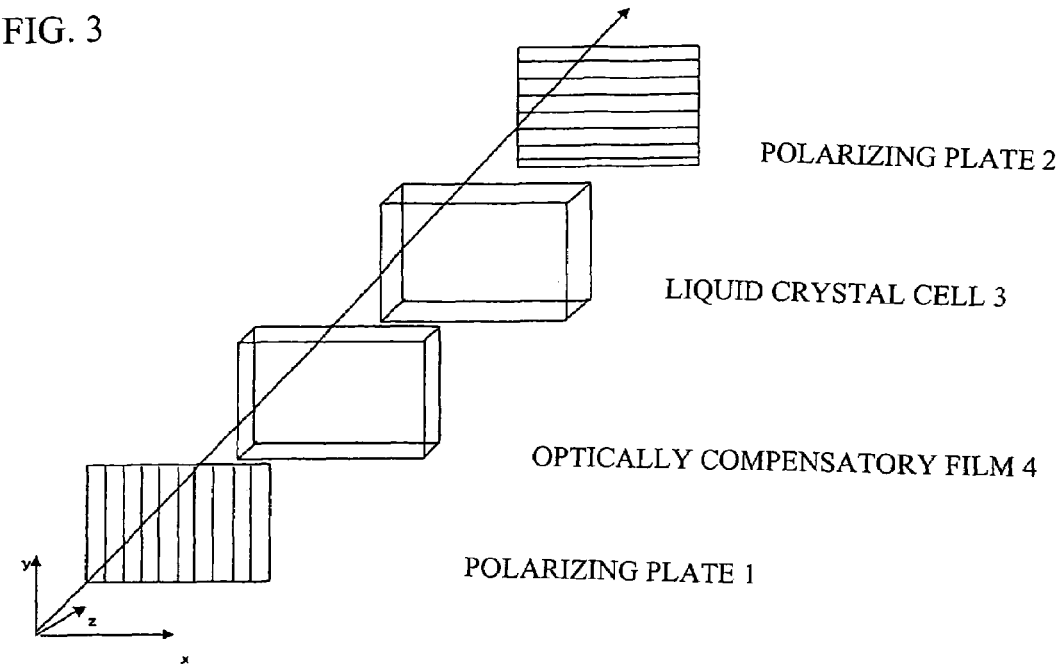
FIG. 3 is a schematic view illustrating an example of a liquid crystal display according to an aspect of the invention.

FIG. 3 is a model view showing an example of the constitution for explaining a function of the invention. In the constitution of FIG. 3, an optical resin film (hereinafter sometimes referred to as an optically compensatory film too) 4 is provided between a liquid crystal cell 3 and a polarizing plate 1 as shown in the constitution of FIG. 1. As described above, the optically compensatory film 4 fulfills the following formulae (A) to (D):

$$0.1 < Re(450)/Re(550) < 0.95 \quad (A)$$

$$1.03 < Re(650)/Re(550) < 1.93 \quad (B)$$

$$0.4 < (Re/Rth(450)/Re/Rth(550)) < 0.95 \quad (C)$$

$$1.05 < (Re/Rth(650)/Re/Rth(550)) < 1.9. \quad (D)$$

By using the optically compensatory film having the optical characteristics as described above, it is possible in the invention to optically compensate obliquely incident lights at wavelengths R, G and B by slow axes and retardations differing from wavelength to wavelength. As a result, the viewing angle contrast in black display is extremely improved and coloration in black display depending on viewing direction is extremely relieved, compared with the existing liquid crystal displays. As the wavelengths R, G and B, use is made therein a wavelength 650 nm as R, a wavelength 550 nm as G and a wavelength 450 nm as B. Although the wavelengths R, G and B are not always typified by these wavelengths, these wavelengths are seemingly adequate for specifying the optical characteristics whereby the advantages of the invention are established.

Figure 4:
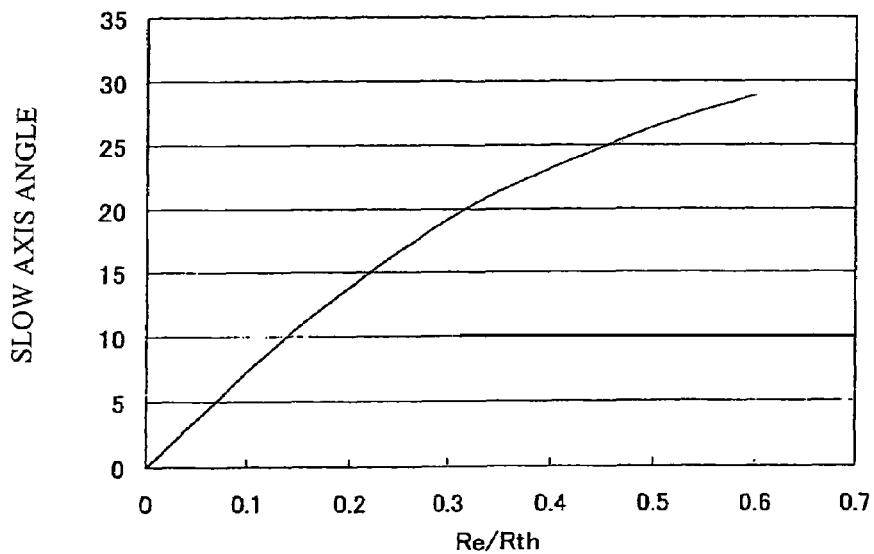
FIG. 4 is a graph showing the optical characteristics of an illustrative optical compensatory film to be used in an aspect of the invention.

In an aspect of the invention, particular attention is paid to Re/Rth that is the ratio of Re to Rth. This is because the Re/Rth value determines two intrinsic polarization axes in the transmission of light obliquely traveling in a biaxial birefringent medium. FIG. 4 shows an example of the calculated result on the relationship between the direction of one of two intrinsic polarization axes and Re/Rth in the case of an incident light obliquely traveling. Concerning the light transmission in this case, it is presumed that the azimuth angle is 45° while the polar angle is 34°. The results given in FIG. 4 indicate that one of the intrinsic polarization axes can be determined by determining Re/Rth. The change in the polarization state of the incident light caused by the passage through the optically compensatory film is determined mainly depending on the in-plane slow axis direction of the optically compensatory film and the retardation of the optically compensatory film. In the invention, both of the in-plane slow axis and the retardation, which are main factors determining the change in the polarization state, are optimized at each of the R, G and B wavelengths by specifying the relationship Re/Rth at each of the R, G and B wavelengths. As a result, complete compensation can be established by using one optically compensatory film and thus lowering in contrast can be relieved, even in the case having two factors, i.e., the liquid crystal layer is affected by retardation in an oblique direction due to an obliquely incident light and the apparent transmission axes of the polarizing plates 1 and 2 are deviated. That is to say, by determining the parameters of the film with the use of R, G and B as representatives of the whole visible light region, almost complete compensation can be established all over the visible light region.

In the VA mode, liquid crystal molecules are vertically aligned when no voltage is applied (i.e., black display). Therefore, it is preferable that the in-plane slow axis of the optically compensatory film 4 is located perpendicular or parallel to the polarizing plate 1 or the polarizing plate 2 so that the polarization state of incident light from the normal line direction is not affected by the retardation of the optically compensatory film 4. An optically compensatory film may be further provided between the polarizing plate 2 and the liquid crystal cell 3. In this case, it is also preferable that the in-plane slow axis of the optically compensatory film is located perpendicular or parallel to the polarizing plate 1 or the polarizing plate 2.

Figure 5:
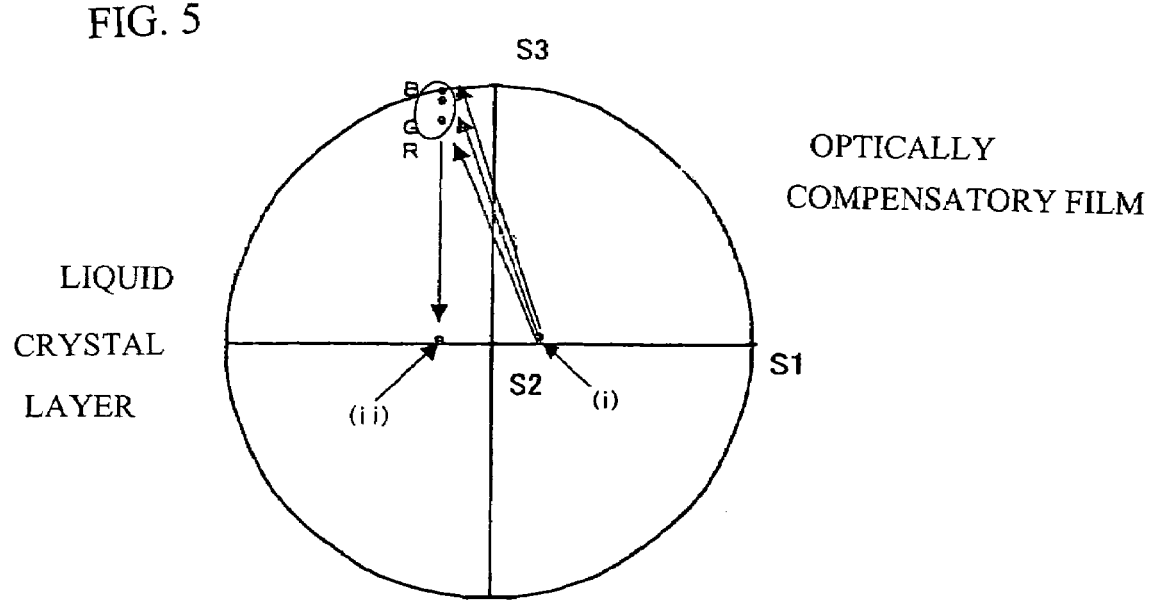
FIG. 5 is a schematic view showing a Poincare sphere which is used in illustrating a change in the polarization state of an incident light in a liquid crystal display according to an aspect of the invention.

FIG. 5 illustrates the compensation mechanism in the constitution of FIG. 3 by using a Poincare sphere. In this case, the light transmission direction is 45° in the azimuth angle and 34° in the polar angle. In FIG. 5, the S2 axis is an axis perpendicularly passing downward through the paper plane. In FIG. 5, the Poincare sphere is observed from the positive direction of the S2 axis. Since FIG. 5 is two-dimensionally drawn, dislocations of points before and after a change in the polarization state are shown by arrows. In practice, however, a change in the polarization state caused by the passage through the liquid crystal layer or the optically compensatory film is expressed on the Poincare sphere by rotating at a specific angle around a specific axis that is determined depending on the individual optical characteristics.

The polarization state of the incident light passing through the polarizing plate 1 in FIG. 3 corresponds to the point (i) in FIG. 5, while the polarization state of the light blocked by the absorption axis of the polarizing plate 2 in FIG. 3 corresponds to the point (ii) in FIG. 5. The light leakage in OFF AXIS in an oblique direction occurring in the existing VA mode liquid crystal displays is caused by the deviation of the points (i) and (ii). In general, an optically compensatory film is employed to shift the polarization state of an incident light from the point (i) to the point (ii) including a change in the polarization state in the liquid crystal layer. Since the liquid crystal layer of the liquid crystal cell 3 shows a positive refractive index anisotropy and is vertically aligned, the change in the polarization state of the incident light caused by the passage of the liquid crystal layer is indicated by the downward arrow on the Poincare sphere in FIG. 5 and expressed as rotation around the S1 axis. To completely block the visible light after passing through the liquid crystal layer by the polarizing plate 2, the starting points before the rotation should be located on the line rotating the points (ii) relating respectively to R, G and B around the S1 axis. Since the rotation angle is proportional to the value dividing the effective retardation Δn'd' of the liquid crystal layer from an oblique direction by the wavelength (Δn'd'/λ), the rotation angles R, G and B at different wavelengths are different from each other. To locate all of the polarization states of R, G and B after the rotation at the points (ii), therefore, it is required that the polarization states of R, G and B before the rotation are all located at positions corresponding to the rotation angles thereof which are on the line formed by rotating the points (ii) around the S1 axis, as shown in FIG. 5. To achieve the above-described polarization states for each of R, G and B, a optically compensatory film fulfilling the Re/Rth of each of R, G and B are provided and thus optical compensation is conducted in the invention.

Figure 6:
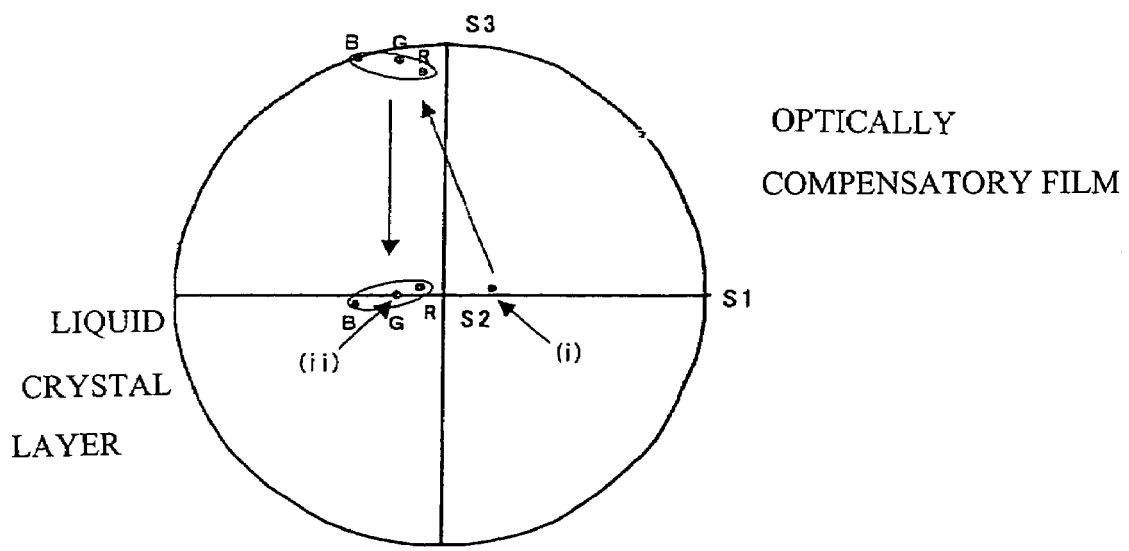
FIG. 6 is a schematic view showing a Poincare sphere which is used in illustrating a change in the polarization state of an incident light a liquid crystal display of the background art.

On the other hand, FIG. 6 shows an example in the background art. In the case as shown in FIG. 6, an optically compensatory film having a constant Re/Rth for wavelength is employed. In this case, for example, when the optical characteristics of the optically compensatory film are controlled so that the starting point of G light before the rotation by the liquid crystal layer is located on the line rotating the point (ii) around the S1 axis, the points (ii) of R and B lights cannot be located on this line. As a result, the R and B lights passing through the liquid crystal layer would not undergo the change into the polarization states of the points (ii) and thus the lights cannot be completely blocked by the absorption axis of the polarizing plate. As a result, there arises light leakage of R light and B light, thereby causing color-shift in black display. The same applies to the case of using an optically compensatory film having been optimized exclusively for R light and B light.

An aspect of the invention is characterized in that optical characteristics wherein wavelength dispersion of retardation of an incident light in the normal direction differs from that of a light in an oblique direction (for example, a direction with a polar angle of 60°) are imparted to a film and these characteristics are actively utilized in optical compensation. The invention is not restricted in its scope to a certain display mode of liquid crystal layers but applicable to liquid crystal displays liquid crystal layers of having any display mode such as the VA mode, the IPS mode, the ECB mode, the TN mode, the OCB mode and so on.

Next, the optical characteristics, starting materials, production methods, etc. of an optical resin film according to an aspect of the invention will be illustrated in greater detail.

An optical resin film according to an aspect of the invention contributes to the enlargement of the viewing angle contrast and relief for color-shift depending on viewing angle of a liquid crystal display, in particular, a VA mode liquid crystal display. The optical resin film of the invention may be provided either between the polarizing plate in the observer side (watcher side) and the liquid crystal cell or between the polarizing plate in the back side and the liquid crystal cell, or optical resin films of the invention may be provided at both of these positions. For example, the optical resin film may be employed within the liquid crystal display as an independent member. Alternatively, the above-described optical characteristics may be imparted to a protective film for protecting a polarizer and the resultant protective film, which serves as an optically compensatory film too, may be employed as a member of a polarizing plate into the liquid crystal display.

Concerning the formulae (A) to (D), it is preferable in the optical resin film of the invention that $0.1<(A)<0.95$, $1.03<(B)<1.93$, $0.4<(C)<0.95$ and $1.05<(D)<1.9$, more preferably $0.15<(A)<0.95$, $1.08<(B)<1.93$, $0.45<(C)<0.95$ and $1.10<(D)<1.9$, and particularly preferably $0.2<(A)<0.95$, $1.15<(B)<1.93$, $0.5<(C)<0.95$ and $1.15<(D)<1.9$.

It is also preferable that the retardation in the thickness-direction (Rth) corresponds to such a level as canceling the retardation of the liquid crystal layer, the preferable range thereof varies depending on the mode of each liquid crystal layer and the number of optically compensatory films employed. In the case of using in optical compensation for a VA mode liquid crystal cell (for example, a VA mode liquid crystal cell having a liquid crystal layer with the product (And) of the thickness d (μm) and the refractive index anisotropy Δn ranging from 0.2 to 1.0 μm), Rth preferably ranges from 70 to 400 nm, more preferably from 100 nm to 400 nm and more preferably from 100 to 300 nm. Although the retardation value Re is not particularly restricted, it generally ranges from 20 to 110 nm, preferably from 20 to 70 nm and more preferably from 50 to 70 nm. Although the thickness of the optical resin film is not particularly restricted, it generally ranges from, for example, 10 to 150 μm, preferably from 40 to 110 μm, more preferably from 60 to 110 μm and still preferably from 80 to 110 μm.

In the invention, the optical resin film may be, for example, a stretched birefringent polymer film. The structure of the optical resin film is not restricted to a single layered structure. Namely, it may have a layered structure composed of multiple layers stacked together. In the case of a layered structure, individual layers may be made of different materials. For example, use may be made of a layered product composed of a polymer film with an optically anisotropic layer comprising a liquid crystal compound.

In the case of using a liquid crystal compound in producing the optical resin film as described above, the liquid crystal compound has various orientation modes. Thus, desired optical characteristics can be expressed by using an optically anisotropic layer, either as a single layer or as a layered product composed of multiple layers, produced by fixing the liquid crystal compound to a specific orientation mode. That is, the optical resin film may be in the mode comprising a support and one or more optically anisotropic layers formed on the support. The retardation of the whole optical resin film in this mode can be controlled depending on the optical anisotropy of the optically anisotropic layer. Liquid crystal compounds are classified into rod-shaped liquid crystal compounds and discotic liquid crystal compounds. These liquid crystal compounds include low-molecular ones and high-molecular ones and any of them can be used herein. In the case of using a liquid crystal in producing the optical resin film as described above, it is preferred to use a rod-shaped liquid crystal compound or a discotic liquid crystal compound. It is still preferred to use a rod-shaped liquid crystal compound having a polymerizable group or a discotic liquid crystal compound having a polymerizable group.

As a material for forming an optical resin film of the invention, use is made of a polymer or a copolymer of a cycloolefin compound.

(Cycloolefin Compound)

Examples of the cycloolefin compound include polycyclic unsaturated hydrocarbons and derivatives thereof such as norbornene, dicyclopentadiene, tetracyclododecene, ethyltetracyclododecene, ethylidene tetracyclododecene and tetracyclo$(7.4.0.1^{10,13}.0^{2,7})$trideca-2,4,6,11-tetraene; and monocyclic unsaturated hydrocarbons and derivatives thereof such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, cycloheptene, cyclopentadiene and cyclohexadiene. These cycloolefin compounds may have a polar group as a substituent. As the polar group, there can be enumerated a hydroxyl group, a carboxyl group, an alkoxyl group, an epoxy group, a glycidyl group, an oxycarbonyl group, a carbonyl group, an amino group, an ester group, a carbonate anhydride group and a combination thereof (e.g., an amido group and an imido group). In particular, an ester group, a carboxyl group or a carbonate anhydride group is suitable therefor.

The polymer or copolymer to be used in the invention may have a monomer other than the cycloolefin compound having been addition-copolymerized therewith. As the monomer usable in the addition copolymerization, there can be enumerated ethylene or α-olefins such as ethylene, propylene, 1-butene and 1-pentene; and dienes such as 1,4-hexadiene, 4-methyl-1,4-hexadiene, 5-methyl-1,4-hexadiene and 1,7-octadiene.

The polymer or copolymer to be used in the invention can be obtained by addition polymerization or metathesis ring-opening polymerization. The polymerization is conducted in the presence of a catalyst. Examples of the catalyst for the addition polymerization include polymerization catalysts comprising a vanadium compound and an organic aluminum compound. Examples of the catalyst for the ring-opening polymerization include polymerization catalysts comprising a halide of a metal such as ruthenium, rhodium, palladium, osmium, iriduim or platinum, a nitric acid salt or an acetylacetone compound together with a reducing agent; and polymerization catalysts comprising a halide of a metal such as titanium, vanadium, zirconium, tungsten or molybdenum and an organic aluminum compound. Although the polymerization temperature, pressure, etc. are not particularly restricted, the polymerization is usually conducted at a temperature of from −50° C. to 100° C. under a pressure of form 0 to 50 kgf/cm².

The mass-average molecular weight (weight-average molecular weight) of the polymer or copolymer to be used in the invention preferably ranges from 200 to 20,000, more preferably from 500 to 18,000.

As the polymer or copolymer to be used in the invention, use can be preferably made of a thermoplastic norbornene resin. Examples of the thermoplastic norbornene resin include ZEONEX and ZEONOR (manufactured by ZEON CORPORATION) and ARTON (manufactured by JSR). Examples other than the above include a polymer containing a structure represented by formula (1):

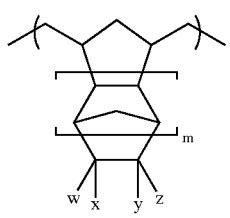

In the formula (1), w, x, y and z each independently represents a hydrogen atom, an alkyl group which may have a substituent, an aryl group which may have a substituent, or a polar group. At least one of w, x, y and z include, as the above substituent or a substituent for the hydrogen atom, a hydrogen-withdrawal aromatic compound. At least two of w, x, y and z may be combined to form a ring. The aromatic compound has an absorption maximum at a wavelength of 250 to 400 nm and a molar absorbance coefficient of 10 to 100,000. m represents 0 or 1. The aromatic compound includes an aromatic hetero compound. The aromatic compound is not restricted as long as the compound has the above optical characteristics. Examples of the polar group include those as the above-mentioned.

Examples of the polymer having the structure of the formula (1) are set forth below, but the invention is not restricted thereto. In the following examples, numeric values beside parentheses represent a molar ratio of the respective units in the copolymer. Examples having no numeric values are homopolymers constituted by sole unit.

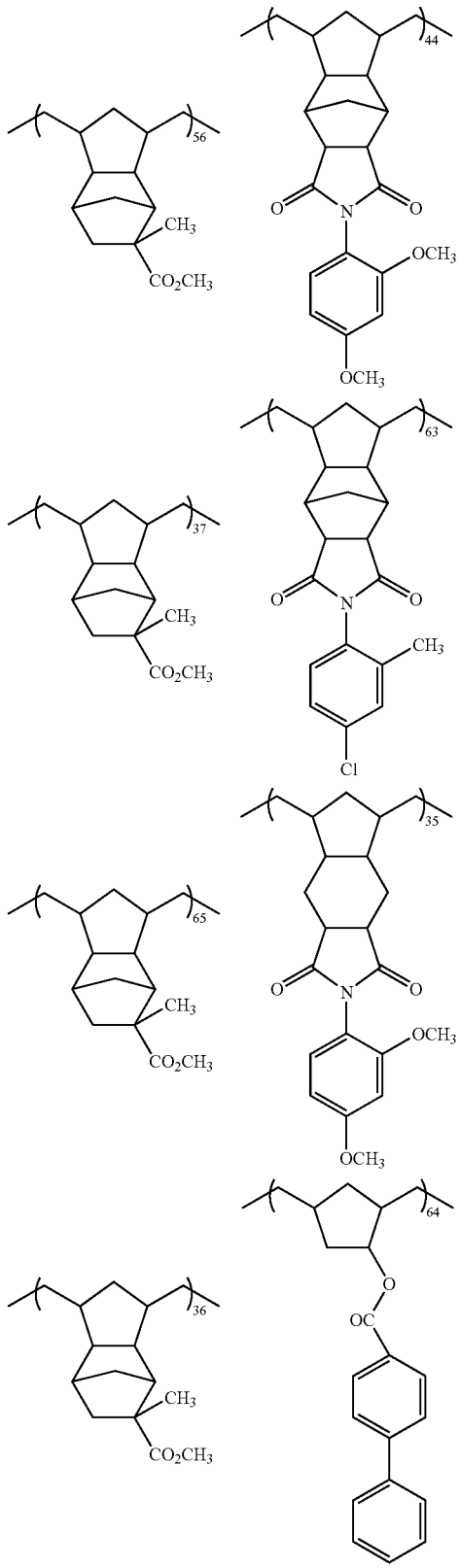

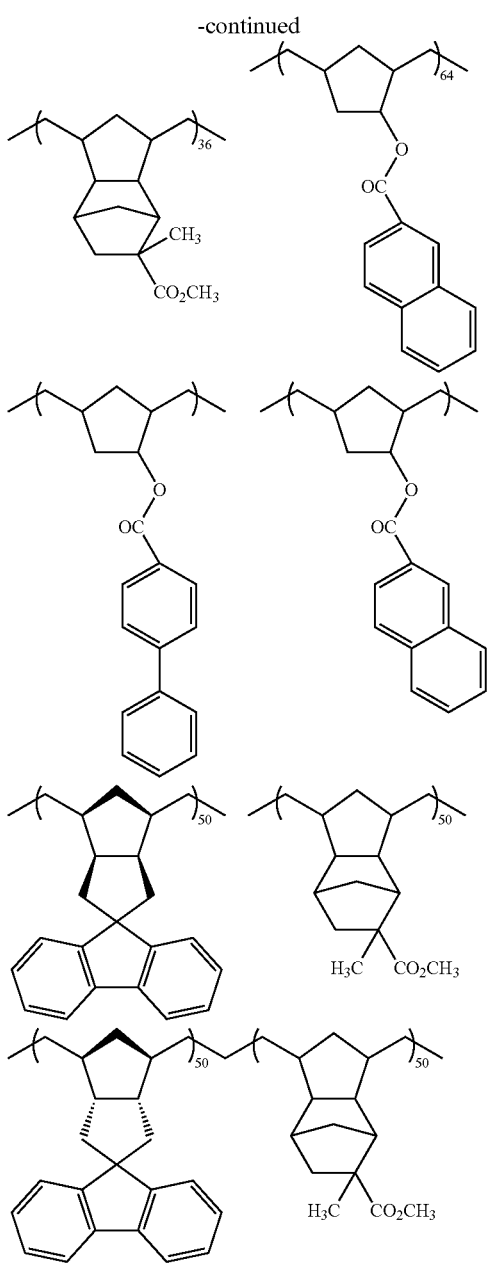

The polymer or copolymer to be used in the invention may be prepared by introducing a crosslinking group, which undergoes crosslinkage due to light or heat, into a cycloolefin compound monomer, and polymerizing the monomer via crosslinkage to thereby give a polymer having a pseudo-desired molecular weight.

As the crosslinking group, there can be enumerated a polymerizable unsaturated double bond group or an epoxy group, for example, a vinyl group, an alkenyl group such as an allyl group, an acrylate residue and a methacrylate residue.

The cycloolefin compound having a polymerizable unsaturated double bond group or an epoxy group may be polymerized by using heat, UV light, etc. without resorting to a polymerization initiator. If necessary, use may be made of a radical polymerization catalyst such as azobisisobutyronitrile (AIBN) or benzoyl peroxide (BPO), an anionic polymerization catalyst or a cationic polymerization catalyst.

Preferable examples of a photopolymerization initiator include a benzoin derivative, a benzyl ketal derivative such as IRGACURE 651, an α-hydroxyacetophenone derivative such as 1-hydroxycyclohexylphenyl ketone (IRGACURE 184), and α-aminoacetophenone derivative such as IRGACURE 907.

As cycloolefin compound having a polymerizable unsaturated double bond group or an epoxy group as a crosslinking group, it is preferable in the invention to use a cycloolefin compound having a plural number of substituents carrying such a polymerizable unsaturated double bond group or an epoxy group from the viewpoint of, in particular, reactivity.

Either one of these cycloolefin compound having a polymerizable unsaturated double bond group or an epoxy group or a mixture of two or more thereof may be used.

In the case of photopolymerizing the cycloolefin compound having a polymerizable unsaturated double bond group or an epoxy group according to the invention, use may be made of the technique of irradiating with an energy beam such as ultraviolet light. As the ultraviolet light irradiation source, there can be enumerated a low-pressure mercury lamp, a medium-pressure mercury lamp, a high-pressure mercury lamp, an ultrahigh-pressure mercury lamp, a xenon lamp, a carbon arc, a metal halide lamp and solar rays. Photopolymerization under ultraviolet light irradiation can be carried out in the atmosphere or an inert gas. Although the photopolymerization using a cycloolefin compound having a polymerizable unsaturated double bond group may be conducted in the atmosphere, it is preferred to conduct the photopolymerization in an environment at an oxygen concentration having been minimized by purging with nitrogen, etc. so a to shorten the induction period of the polymerization. The irradiation intensity of the ultraviolet light may be from about 0.1 to 200 mW/cm$^2$, preferably from about 100 to 30,000 mJ/cm$^2$.

(Additives)

The optical resin film of the invention may be formed by hot-melting the polymer or copolymer as described above and then forming a film. Alternatively, it may be formed from a solution, in which the polymer has been uniformly dissolved, by the solution film-forming (solvent cast) method. In the hot-melt film formation, various additives (for example, a compound capable of lowering optical anisotropy, a wavelength dispersion regulator, a UV-blocking agent, a plasticizer, an antidegradant, fine particles, an optical characteristic-controlling agent, etc.) can be added at the hot-melting step.

In the case of forming the optical resin film from a solution, on the other hand, various additives (for example, a compound capable of lowering optical anisotropy, a wavelength dispersion regulator, a UV-blocking agent, a plasticizer, an antidegradant, fine particles, an optical characteristic-controlling agent, etc.) can be added to the polymer solution (hereinafter called "dope") depending on purpose in individual steps of the production. These additives may be added in any step of preparing the dope. Alternatively, a step of adding the additives may be provided in the final step of preparing the dope.

To establish the desired wavelength dispersion properties represented by the above formulae (A), (B), (C) and (D), it is particularly preferred to add a wavelength dispersion regulator to the film.

The above wavelength dispersion regulator, which is preferably used in the invention, has preferably a molecular weight of 250 to 1,000 from the viewpoint of sublimability. The molecular weight is more preferably 260 to 800, even more preferably 270 to 800, and particularly preferably 300 to 800. When the molecular weight is in this range, the compounds may have a specific monomer structure, an oligomer structure in which plural monomer units are bonded together, and a polymer structure.

It is preferable that the wavelength dispersion regulator would not vaporize at any step in the forming the optical resin film of the invention.

(Amount of Compound to be Added)

An amount of the wavelength dispersion regulator to be added, which is preferably used in the invention, is preferably 0.01 to 30% by weight, more preferably 0.1 to 20% by weight, and particularly preferably 0.2 to 10% by weight with respect to solid contents (mainly polymer) of the film.

(Compound Addition Method)

Further, the wavelength dispersion regulator may be used alone or in combination of 2 or more compounds in an arbitrary ratio.

Also, the timing of addition of the wavelength dispersion regulator may be any time during the dope preparation process or after the completion of the dope preparation process.

Specific examples of the wavelength dispersion regulator preferably used in the invention include benzotriazole compounds, benzophenone compounds, cyano group-containing compounds, oxybenzophenone compounds, salicylic acid ester compounds, nickel complex salt compounds and the like, but the invention is not limited to only these compounds.

As a benzotriazole compound, a compound represented by formula (101) can be preferably employed as the wavelength dispersion regulator in the invention.

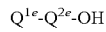
$$Q^{1e}\text{-}Q^{2e}\text{-}OH \qquad \text{Formula (101)}$$

wherein, $Q^{1e}$ is a nitrogen-containing aromatic heterocyclic ring group and $Q^{2e}$ is an aromatic ring group.

$Q^{1e}$ is a nitrogen-containing aromatic heterocyclic ring group, preferably a 5- to 7-membered nitrogen-containing aromatic heterocyclic ring group and more preferably a 5-to 6-membered nitrogen-containing aromatic heterocyclic ring group, and examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene and the like; even more preferably, a 5-membered nitrogen-containing aromatic heterocyclic ring group or a triazine ring, and specific examples thereof include imidazole, pyrazole, triazole, tetrazole, thiazole, oxazole, benzotriazole, benzothiazole, benzoxazole, thiadiazole, oxadiazole and the like; and particularly preferably a benzotriazole ring.

A nitrogen-containing aromatic heterocyclic ring represented by $Q^{1e}$ may further have a substituent, and the substituent may be exemplified by the following substituent T. Moreover, in the case of having a plurality of substituents, each substituent may be fused to further form a ring.

The aromatic ring represented by $Q^{2e}$ may be an aromatic hydrocarbon ring or an aromatic heterocyclic ring. Also, the aromatic rings may be monocyclic or may form a fused ring with other rings.

The aromatic hydrocarbon ring is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring is preferably an aromatic heterocyclic ring containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferable examples of the aromatic heterocyclic ring include a pyridine ring, a triazine ring, and a quinoline ring.

The aromatic ring represented by $Q^{2e}$ is preferably an aromatic hydrocarbon ring group, more preferably a naphthalene ring group or a benzene ring group, and particularly preferably a benzene ring group. $Q^{2e}$ may further have a substituent, and the following substituent T is preferably used.

Examples of the substituent T include an alkyl group (preferably having 1 to 20 carbon atoms, more preferably 1 to 12 carbon atoms, and particularly preferably 1 to 8 carbon atoms; e.g., methyl, ethyl, iso-propyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atoms, and particularly preferably 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., a phenyloxycarbonyl group, etc.), an acyloxy group (preferably having 2 to 20 carbon atoms, more preferably 2 to 16 carbon atoms, and particularly preferably 2 to 10 carbon atoms; e.g., acetoxy, a benzoyloxy group, etc.), an acylamino group (preferably having 2 to 20 carbon atoms, more preferably 2 to 16 carbon atoms, and particularly preferably 2 to 10 carbon atoms; e.g., an acetylamino group, a benzoylamino group, etc.), an alkoxycarbonylamino group (preferably having 2 to 20 carbon atoms, more preferably 2 to 16 carbon atoms, and particularly preferably 2 to 12 carbon atoms; e.g., a methoxycarbonylamino group, etc.), an aryloxycarbonylamino group (preferably having 7 to 20 carbon atoms, more preferably 7 to 16 carbon atoms, and particularly preferably 7 to 12 carbon atoms; e.g., a phenyloxycarbonylamino group, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., a methanesulfinyl group, a benzenesulfinyl group, etc.), a ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic ring group (preferably having 1 to 30 carbon atoms, more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., a trimethylsilyl group, a triphenylsilyl group, etc.), and the like. These substituents may be further substituted. When there are two or more substituents, they may be identical to or different from each other. If possible, they may be bonded to each other to form a ring.

The compound represented by formula (101) is preferably a compound represented by formula (101-A):

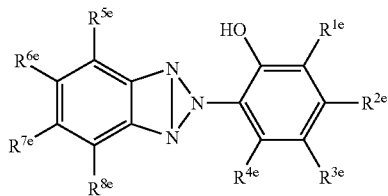

wherein $R^{1e}$, $R^{2e}$, $R^{3e}$, $R^{4e}$, $R^{5e}$, $R^{6e}$, $R^7$ and $R^{8e}$ are each independently a hydrogen atom or a substituent.

$R^{1e}$, $R^{2e}$, $R^{3e}$, $R^{4e}$, $R^{5e}$, $R^{6e}$, $R^{7e}$ and $R^{8e}$ are each independently a hydrogen atom or a substituent, and the substituent may be exemplified by the above-described substituent T. These substituents may be further substituted with other substituents, and the substituents may be fused to each other to form a ring structure.

$R^{1e}$ and $R^{3e}$ are preferably a hydrogen atom, an alkyl group, an alkenyl group, an alkynyl group, an aryl group, a substituted or unsubstituted amino group, an alkoxy group, an aryloxy group, a hydroxyl group, and a halogen atom; more preferably a hydrogen atom, an alkyl group, an aryl group, an alkyloxy group, an aryloxy group, and a halogen atom; even more preferably a hydrogen atom, an alkyl group having 1 to 12 carbon atoms; and particularly preferably an alkyl group having 1 to 12 carbon atoms (preferably having 4 to 12 carbon atoms).

$R^{2e}$ and $R^{4e}$ are preferably a hydrogen atom, an alkyl group, an alkenyl group, an alkynyl group, an aryl group, a substituted or unsubstituted amino group, an alkoxy group, an aryloxy group, a hydroxyl group, and a halogen atom; more preferably a hydrogen atom, an alkyl group, an aryl group, an alkyloxy group, an aryloxy group, and a halogen atom; even more preferably a hydrogen atom, an alkyl group having 1 to 12 carbon atoms; particularly preferably a hydrogen atom or a methyl group; and most preferably a hydrogen atom.

$R^{5e}$ and $R^{8e}$ are preferably a hydrogen atom, an alkyl group, an alkenyl group, an alkynyl group, an aryl group, a substituted or unsubstituted amino group, an alkoxy group, an aryloxy group, a hydroxyl group, and a halogen atom; more preferably a hydrogen atom, an alkyl group, an aryl group, an alkyloxy group, an aryloxy group, and a halogen atom; even more preferably a hydrogen atom, an alkyl group having 1 to 12 carbon atoms; particularly preferably a hydrogen atom or a methyl group; and most preferably a hydrogen atom.

$R^{6e}$ and $R^{7e}$ are preferably a hydrogen atom, an alkyl group, an alkenyl group, an alkynyl group, an aryl group, a substituted or unsubstituted amino group, an alkoxy group, an aryloxy group, a hydroxyl group, and a halogen atom; more preferably a hydrogen atom, an alkyl group, an aryl group, an alkyloxy group, an aryloxy group, and a halogen atom; even more preferably a hydrogen atom or a halogen atom; and particularly preferably a hydrogen atom or a chlorine atom.

The compound represented by formula (101) is preferably a compound represented by formula (101-B):

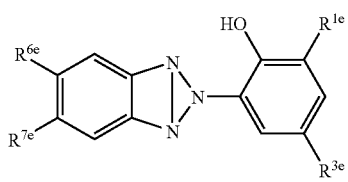

wherein $R^1$, $R^{3e}$, $R^{6e}$ and $R^{7e}$ have the same as meaning as those in formula (101-A), and their preferable ranges are the same as those in formula (101-A).

Next, specific examples of the compound represented by formula (101) will be presented, though the invention is not restricted to these examples.

UV-1
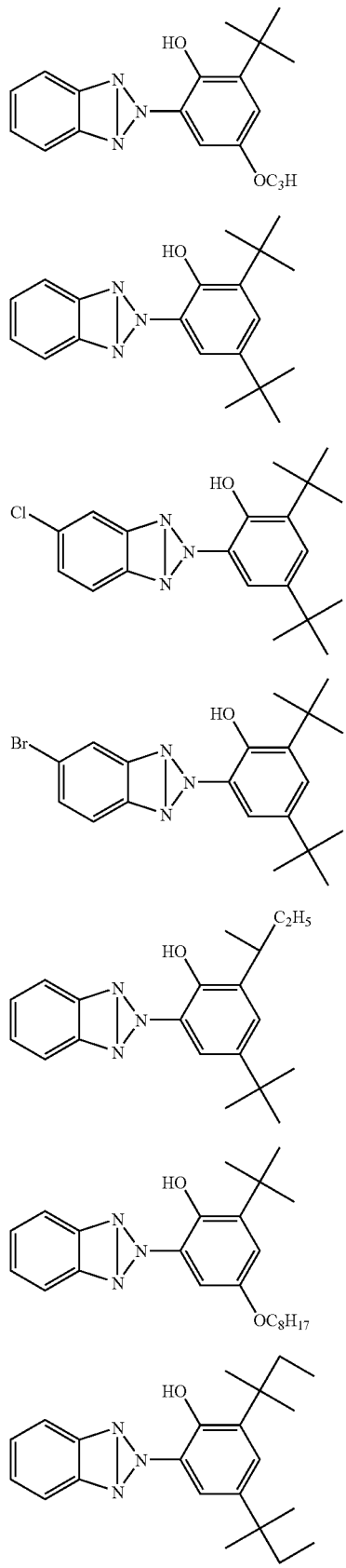
UV-2
UV-3
UV-4
UV-5
UV-6
UV-7
UV-8
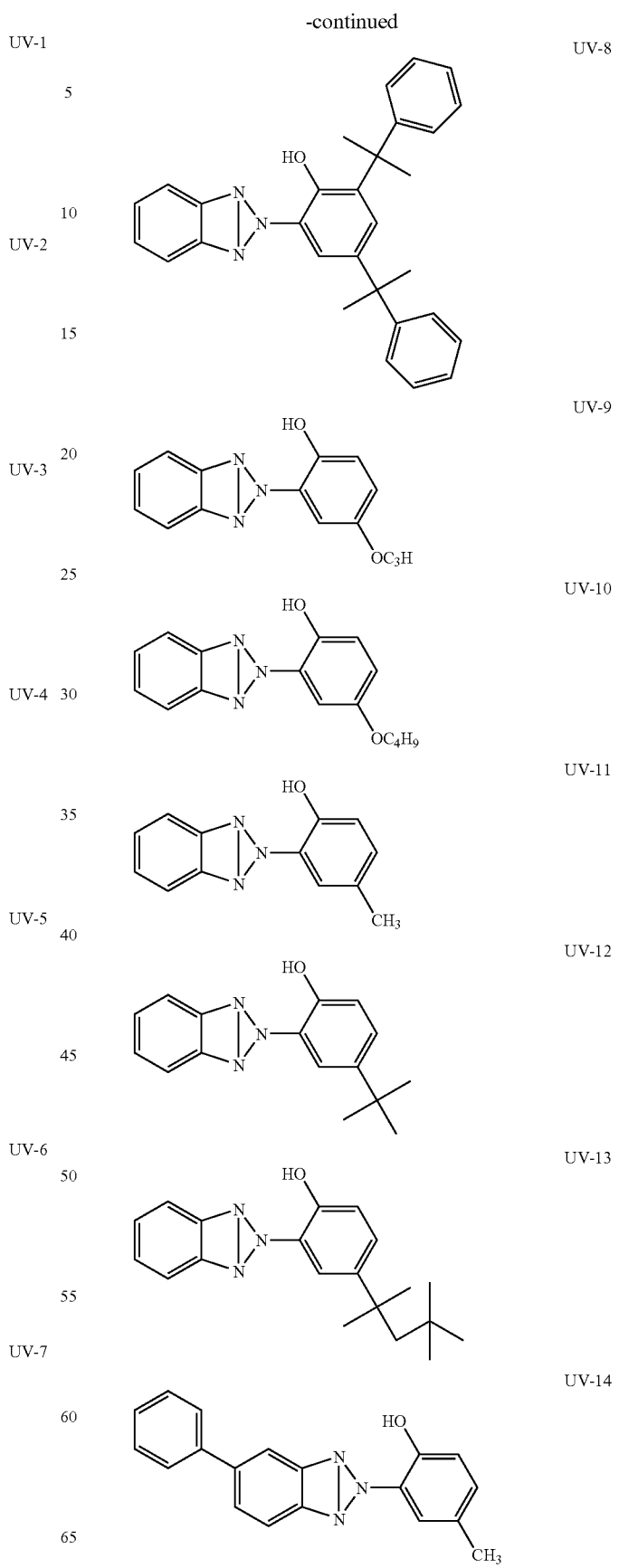
UV-9
UV-10
UV-11
UV-12
UV-13
UV-14

-continued

UV-15
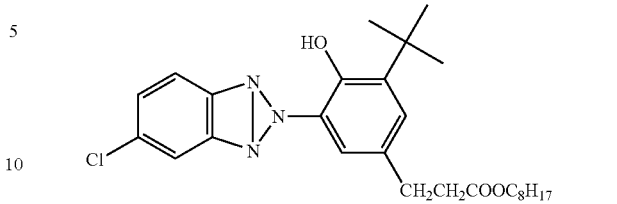

UV-16
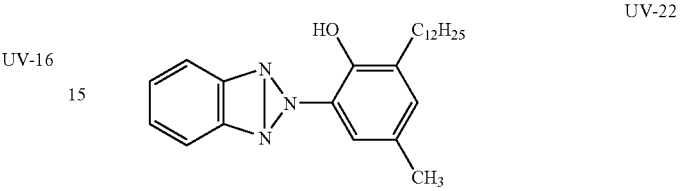

UV-17
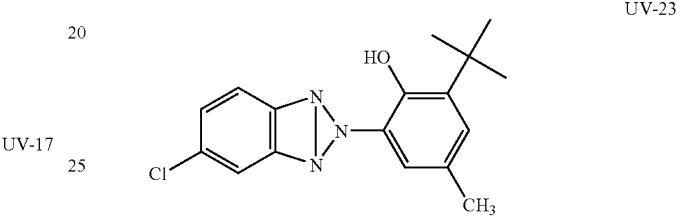

It has been confirmed that, from among the benzotriazole compounds cited above, those having a molecular weight of 320 or less are advantageous in the retention of the optical resin films produced by using the same.

As a benzophenone compound which is one of the wavelength dispersion regulators usable in the invention, a compound represented by formula (102) is preferably employed.

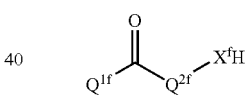

Formula (102)

wherein $Q^{1f}$ and $Q^{2f}$ are each independently an aromatic ring, and $X^f$ is NR (wherein R is a hydrogen atom or a substituent), an oxygen atom or a sulfur atom.

The aromatic ring represented by $Q^{1f}$ and $Q^{2f}$ may be an aromatic hydrocarbon ring or an aromatic heterocyclic ring. These substituents may be monocyclic or may form a fused ring with other rings.

The aromatic hydrocarbon ring represented by $Q^{1f}$ and $Q^{2f}$ is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, even more preferably an aromatic hydrocarbon ring having 6 to 12 carbon atoms, and still more preferably a benzene ring.

The aromatic heterocyclic ring group represented by $Q^{1f}$ and $Q^{2f}$ is preferably an aromatic heterocyclic ring group containing at least one selected from an oxygen atom, a nitrogen atom and a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetra- UV-15
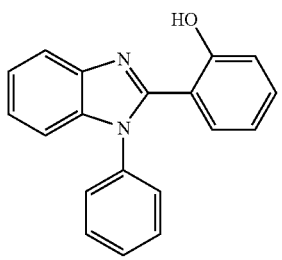

UV-16
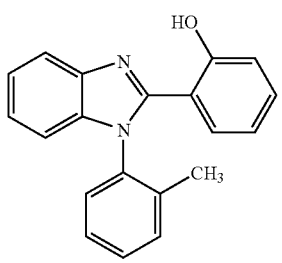

UV-17
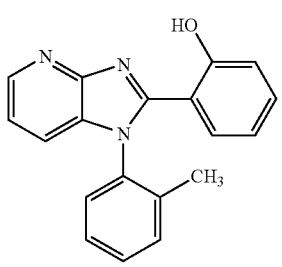

UV-18
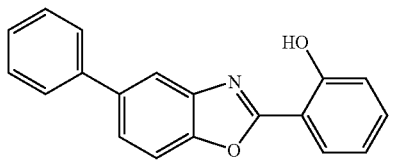

UV-19
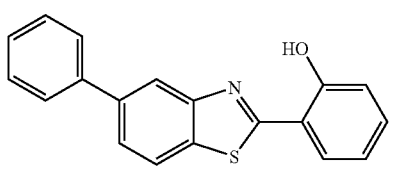

UV-20
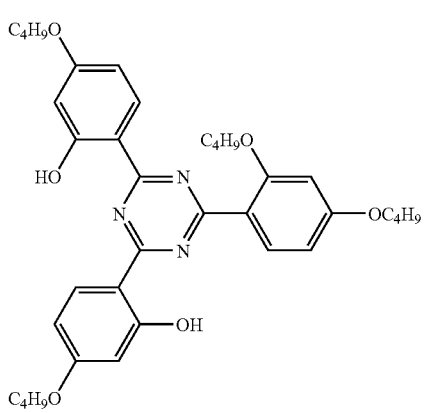

zole, benzimidazole, benzoxazole, benzothiazole, benzotriazole, tetrazaindene and the like. Preferred examples of the aromatic heterocyclic ring are a pyridine ring, a triazine ring and a quinoline ring.

The aromatic ring represented by $Q^{1f}$ and $Q^{2f}$ is preferably an aromatic hydrocarbon ring, more preferably an aromatic hydrocarbon ring having 6 to 10 carbon atoms, and even more preferably a substituted or unsubstituted benzene ring.

$Q^{1f}$ and $Q^{2f}$ may be further substituted, and the substituent is preferably the substituent T. The substituent T has the same meaning as those in formula (101). However, the substituent does not include carboxylic acids, sulfonic acids or quaternary ammonium salts. If possible, the substituents may be fused to each other to form a ring structure.

$X^f$ is NR (wherein R is a hydrogen atom or a substituent, and the substituent may be exemplified by the substituent T), an oxygen atom or a sulfur atom. $X^f$ is preferably NR (wherein R is preferably an acyl group or a sulfonyl group, and these substituents may be further substituted.) or an oxygen atom, and particularly preferably an oxygen atom.

The compound represented by formula (102) is preferably a compound represented by formula (102-A):

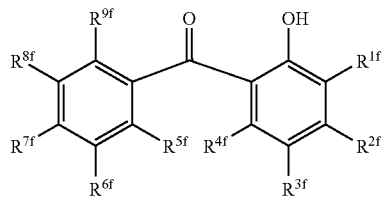

wherein $R^{1f}$, $R^{2f}$, $R^{3f}$, $R^{4f}$, $R^{5f}$, $R^{6f}$, $R^{7f}$, $R^{8f}$ and $R^{9f}$ are each independently a hydrogen atom or a substituent.

$R^{1f}$, $R^{2f}$, $R^{3f}$, $R^{4f}$, $R^{5f}$, $R^{6f}$, $R^{7f}$, $R^{8f}$ and $R^{9f}$ are each independently a hydrogen atom or a substituent, and the substituent may be exemplified by the above-described substituent T. These substituents may be further substituted with other substituents, and the substituents may be fused to each other to form a ring structure.

$R^{1f}$, $R^{3f}$, $R^{4f}$, $R^{5f}$, $R^{6f}$, $R^{8f}$ and $R^{9f}$ are preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; particularly preferably a hydrogen atom or a methyl group; and most preferably a hydrogen atom.

$R^{2f}$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably an alkoxy group having 1 to 20 carbon atoms; and particularly preferably an alkoxy group having 1 to 12 carbon atoms.

$R^{7f}$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 20 carbon atoms (preferably having 1 to 12 carbon atoms, more preferably 1 to 8 carbon atoms, and even more preferably a methyl group); and particularly preferably a methyl group or a hydrogen atom.

The compound represented by formula (102) is more preferably a compound represented by formula (102-B):

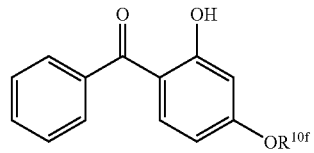

herein $R^{10f}$ is a hydrogen atom, a substituted or unsubstituted alkyl group, a substituted or unsubstituted alkenyl group, a substituted or unsubstituted alkynyl group, or a substituted or unsubstituted aryl group.

$R^{10f}$ is a hydrogen atom, a substituted or unsubstituted alkyl group, a substituted or unsubstituted alkenyl group, a substituted or unsubstituted alkynyl group, or a substituted or unsubstituted aryl group, and the substituents on the aforementioned groups can be exemplified by the substituent T.

$R^{10f}$ is preferably a substituted or unsubstituted alkyl group, more preferably a substituted or unsubstituted alkyl group having 5 to 20 carbon atoms, even more preferably a substituted or unsubstituted alkyl group having 5 to 12 carbon atoms (e.g., an n-hexyl group, a 2-ethylhexyl group, an n-octyl group, an n-decyl group, an n-dodecyl group, a benzyl group, etc.), and particularly preferably a substituted or unsubstituted alkyl group having 6 to 12 carbon atoms (e.g., a 2-ethylhexyl group, an n-octyl group, an n-decyl group, an n-dodecyl group or a benzyl group).

The compound represented by formula (102) can be synthesized by a known method described in JP-A-11-12219.

Specific examples of the compound represented by formula (102) are given below, but the invention is not limited to the specific examples.

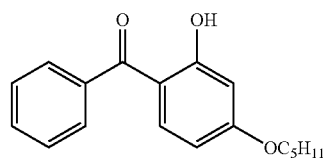

UV-101

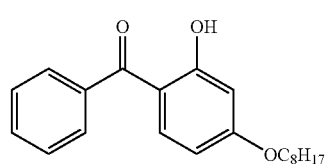

UV-102

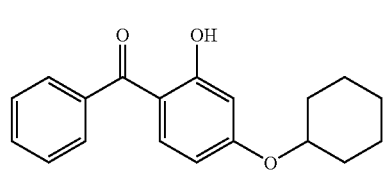

UV-103

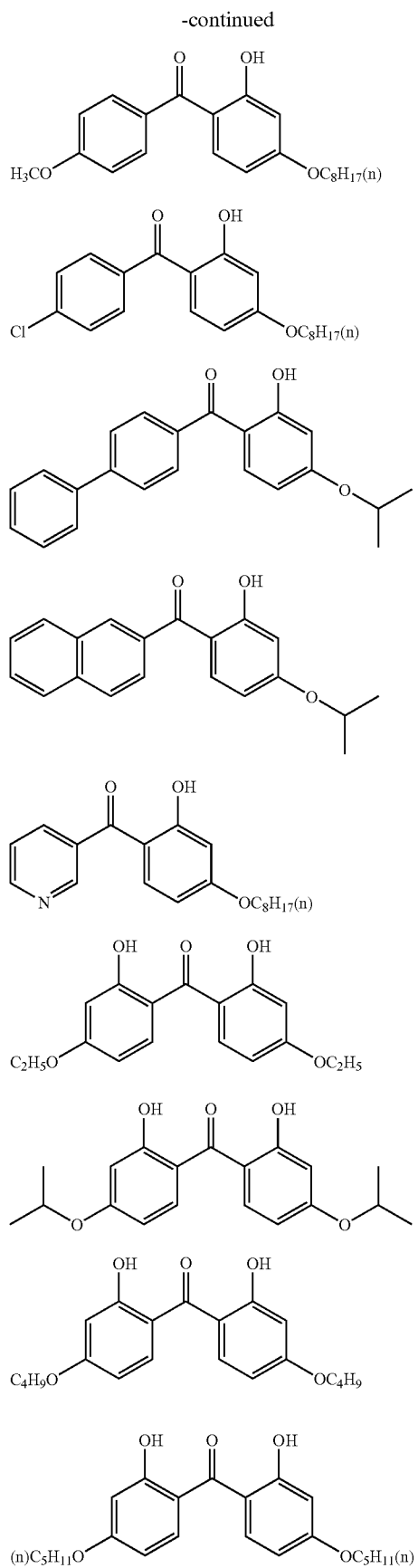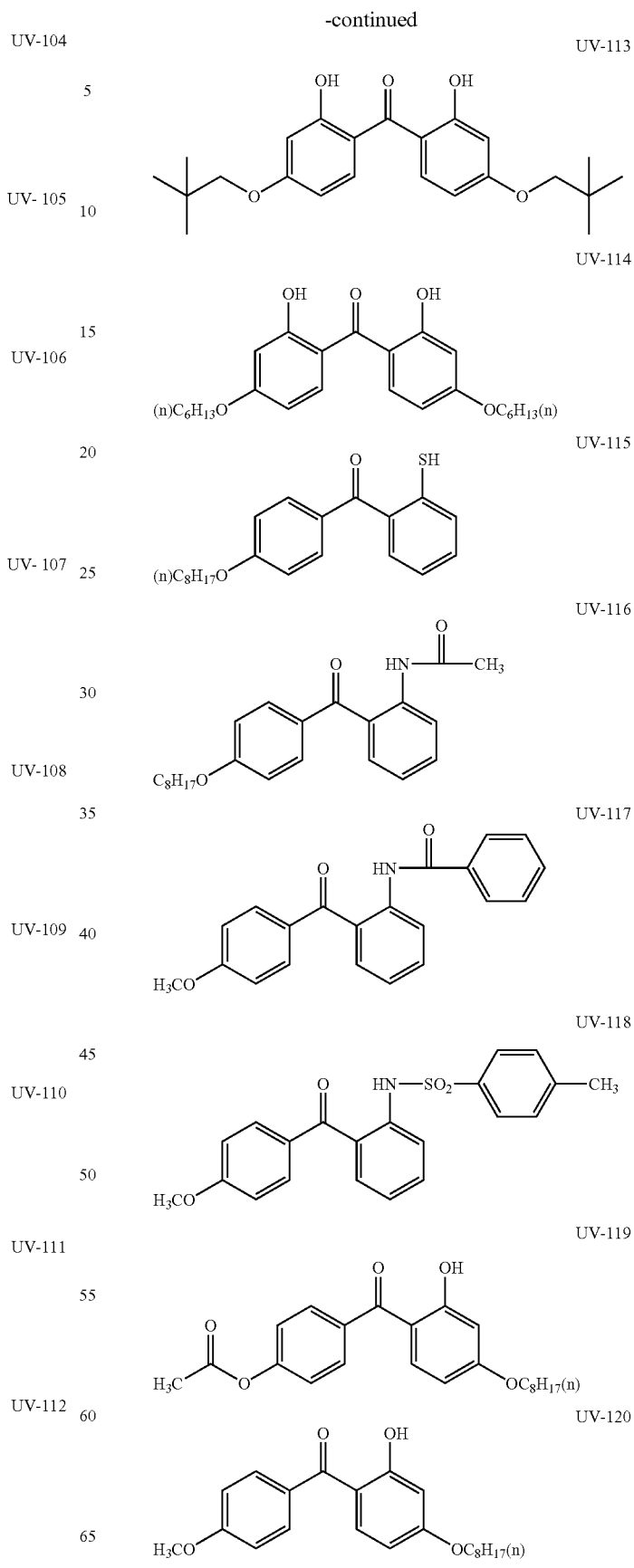

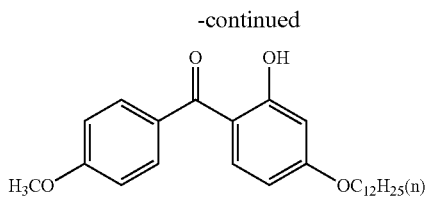

UV-121

As a cyano group-containing compound which is one of the wavelength dispersion regulators usable in the invention, a compound represented by the general formula (103) is preferably employed.

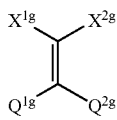

Formula (103)

wherein $Q^{1g}$ and $Q^{2g}$ independently represent each an aromatic ring; and $X^{1g}$ and $X^{2g}$ represent each a hydrogen atom or a substituent, provided that at least one of them represents a cyano group, a carbonyl group, a sulfonyl group or an aromatic heterocycle.

The aromatic ring represented by $Q^{1g}$ and $Q^{2g}$ may be an aromatic hydrocarbon ring or an aromatic heterocyclic ring. Further, these may be monocyclic or may form a fused ring with other rings.

The aromatic hydrocarbon ring is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, even more preferably an aromatic hydrocarbon ring having 6 to 12 carbon atoms, and still more preferably a benzene ring.

The aromatic heterocyclic ring is preferably an aromatic heterocyclic ring containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. The aromatic heterocyclic ring is preferably a pyridine ring, a triazine ring or a quinoline ring.

The aromatic ring represented by $Q^{1g}$ and $Q^{2g}$ is preferably an aromatic hydrocarbon ring, and more preferably a benzene ring.

$Q^{1g}$ and $Q^{2g}$ may be further substituted, and the substituent T is preferably used. The substituent T has the same meaning as those in formula (101).

$X^{1g}$ and $X^{2g}$ are a hydrogen atom or a substituent and at least one group is a cyano group. A substituent represented by $X^1$ and $X^2$ may be exemplified by the above-mentioned substituent T. In addition, the substituent represented by $X^{1g}$ and $X^{2g}$ may be further substituted with other substituents and each substituent represented by $X^{1g}$ and $X^{2g}$ may be fused to form a ring structure.

$X^{1g}$ and $X^{2g}$ are preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; even more preferably a cyano group or a carbonyl group; and particularly preferably a cyano group or an alkoxycarbonyl group (—C(=O) OR (wherein, R is an alkyl group having 1 to 20 carbon atoms, an aryl group having 6 to 12 carbon atoms, and a combination thereof).

The compound represented by formula (103) is preferably a compound represented by formula (103-A):

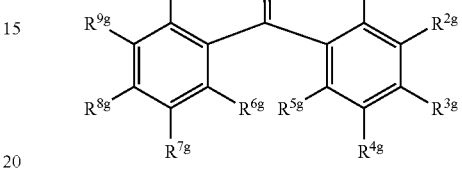

wherein $R^{1g}$, $R^{2g}$, $R^{3g}$, $R^{4g}$, $R^{5g}$, $R^{6g}$, $R^{7g}$, $R^{8g}$, $R^{9g}$ and $R^{10g}$ are each independently a hydrogen atom or a substituent. $X^{1g}$ and $X^{2g}$ have the same meanings as those in formula (103) and their preferable ranges are the same as those in formula (103).

$R^{1g}$, $R^{2g}$, $R^{3g}$, $R^{4g}$, $R^{5g}$, $R^{6g}$, $R^{7g}$, $R^{8g}$, $R^{9g}$ and $R^{10g}$ are each independently a hydrogen atom or a substituent, and the substituent may be exemplified by the above-described substituent T. These substituents may be further substituted with other substituents, and the substituents may be fused to each other to form a ring structure.

$R^{1g}$, $R^{2g}$, $R^{4g}$, $R^{5g}$, $R^{6g}$, $R^{7g}$, $R^{9g}$ and $R^{10g}$ are preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; particularly preferably a hydrogen atom or a methyl group; and most preferably a hydrogen atom.

$R^{3g}$ and $R^{8g}$ are preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 12 carbon atoms, or an alkoxy group having 1 to 12 carbon atoms; and particularly preferably a hydrogen atom.

The compound represented by formula (103) is more preferably a compound represented by formula (103-B):

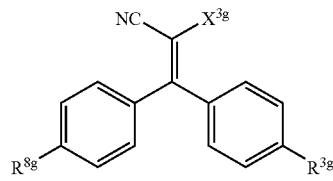

wherein $R^{3g}$ and $R^{8g}$ have the same meanings as those in formula (103-A) and their preferable ranges are the same as those in formula (103-A). $X^{3g}$ is a hydrogen atom or a substituent.

$X^{3g}$ is a hydrogen atom or a substituent, and the substituent may be exemplified by the above-described substituent T. The substituent may be further substituted with other substituents, if possible. $X^{3g}$ is preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; even more preferably a cyano group or a carbonyl group; and particularly preferably a cyano group or an alkoxycarbonyl group (—C(=O)OR (wherein, R is an alkyl group having 1 to 20 carbon atoms, an aryl group having 6 to 12 carbon atoms, and a combination thereof).

The compound represented by formula (103) is more preferably a compound represented by formula (103-C):

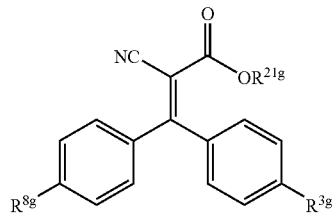

wherein $R^{3g}$ and $R^{8g}$ have the same meanings as those in formula (103-A) and their preferable ranges are the same as those in formula (103-A). $R^{21g}$ is an alkyl group having 1 to 20 carbon atoms.

When both of $R^{3g}$ and $R^{8g}$ are a hydrogen atom, $R^{21g}$ is preferably an alkyl group having 2 to 12 carbon atoms, more preferably an alkyl group having 4 to 12 carbon atoms, even more preferably an alkyl group having 6 to 12 carbon atoms, particularly preferably an n-octyl group, a tert-octyl group, a 2-ethylhexyl group, an n-decyl group, or an n-dodecyl group, and most preferably a 2-ethylhexyl group.

When $R^{3g}$ and $R^{8g}$ are not a hydrogen atom, the compound represented by formula (103-C) has a molecular weight of 300 or more, and $R^{21}$ is preferably an alkyl group having 20 or less carbon atoms.

The compound represented by formula (103 can be synthesized by a method described in Journal of American Chemical Society, Vol. 63, p. 3452 (1941).

Specific examples of the compound represented by formula (103) are given below, but the invention is not limited to the specific examples.

UV-201

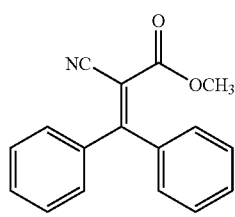

-continued

UV-202

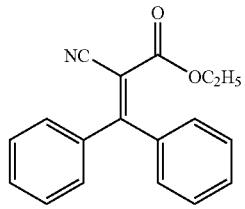

UV-203

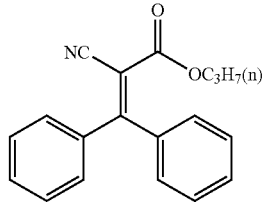

UV-204

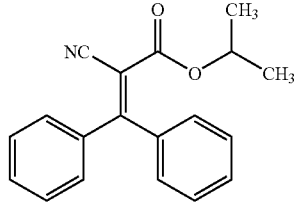

UV-205

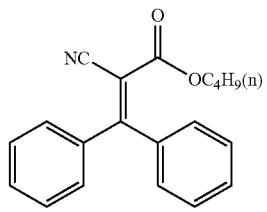

UV-206

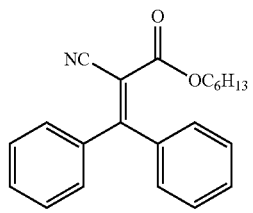

UV-207

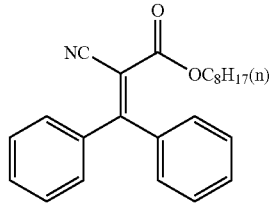

UV-208

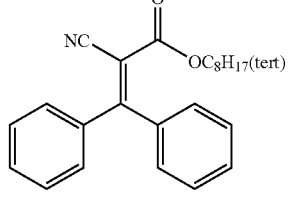

-continued
UV-209
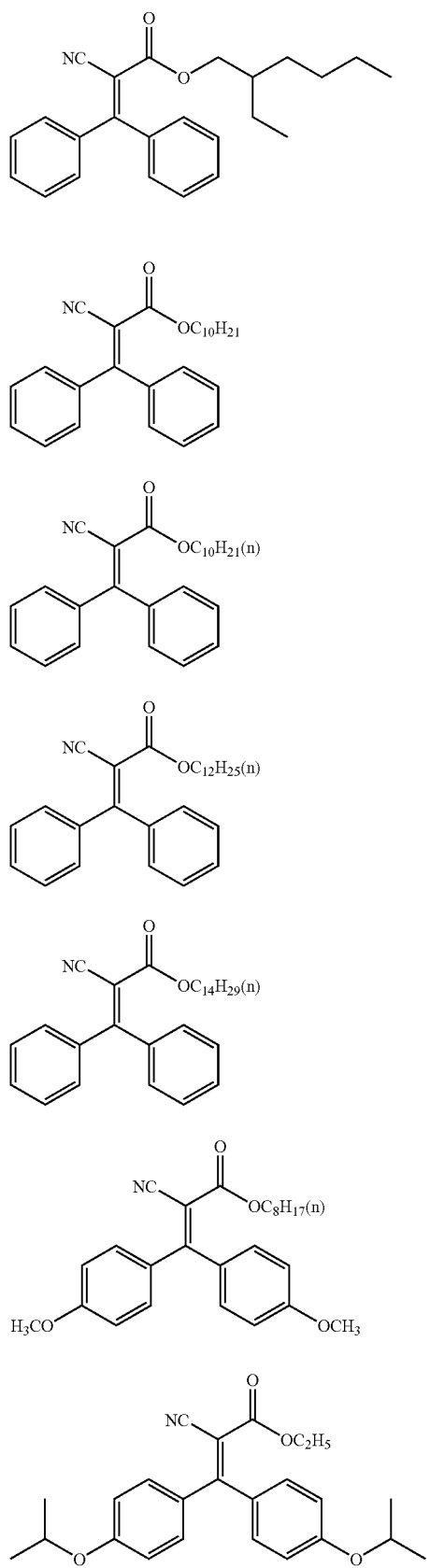
UV-210
UV-211
UV-212
UV-213
UV-214
UV-215
-continued
UV-216
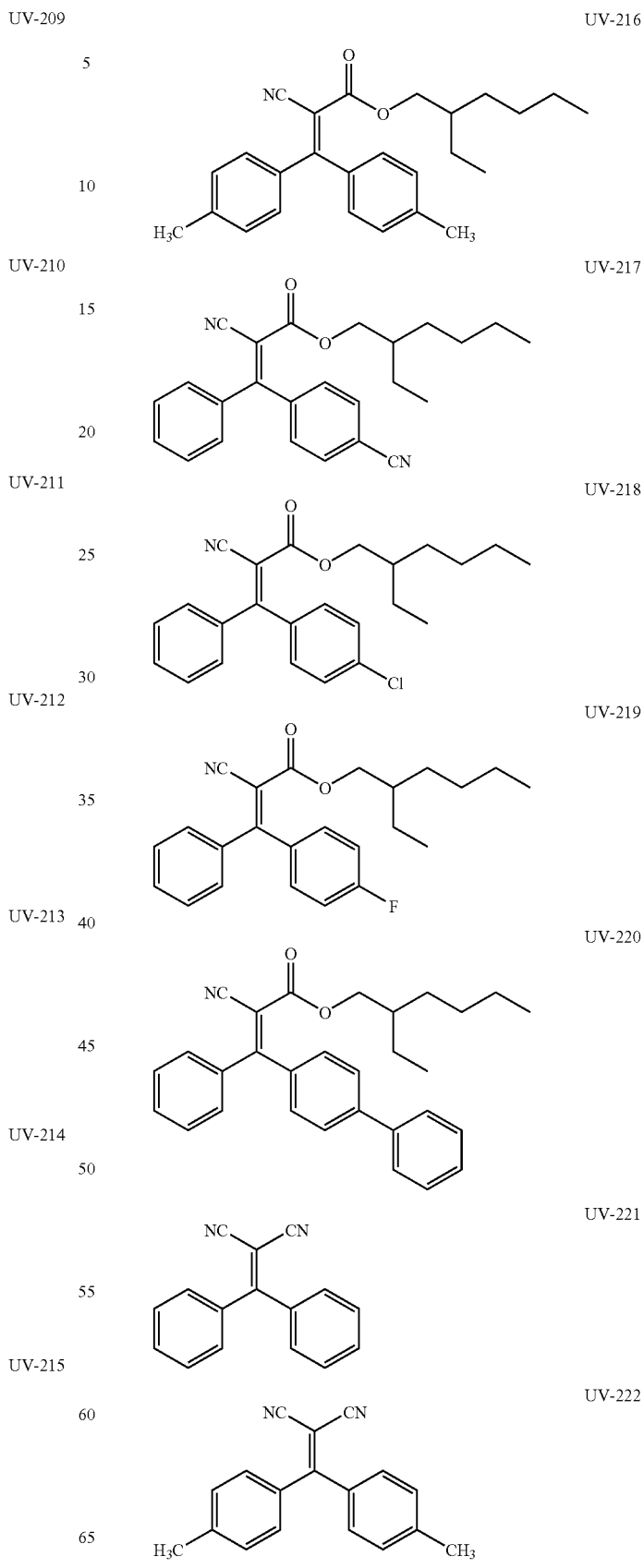
UV-217
UV-218
UV-219
UV-220
UV-221
UV-222

-continued

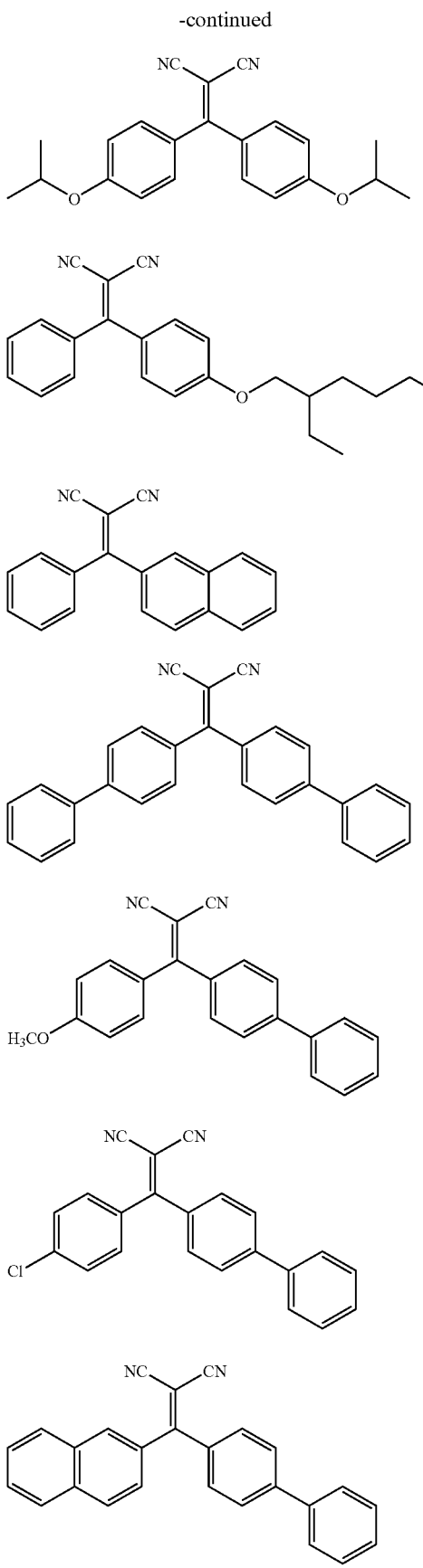

UV-223
UV-224
UV-225
UV-226
UV-227
UV-228
UV-229

-continued

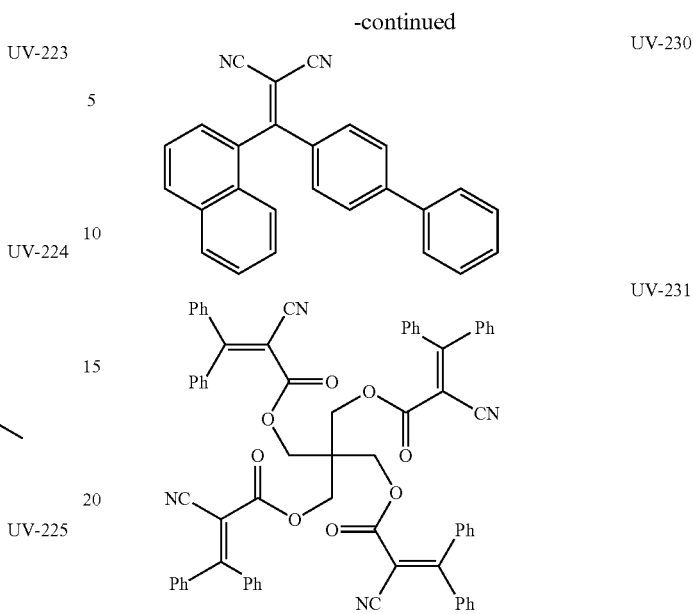

UV-230
UV-231

(Matting Agent Microparticles)

It is preferable to add microparticles as a matting agent to the cellulose acylate film of the invention. The microparticles that can be used for the invention may be exemplified by silicon dioxide, titanium dioxide, aluminum oxide, zirconium oxide, calcium carbonate, talc, clay, calcined kaolin, calcined calcium silicate, calcium hydrosilicate, aluminum silicate, magnesium silicate or calcium phosphate. The microparticles preferably contain silicon in view of lowering the turbidity, and silicon dioxide is particularly preferred. The silicon dioxide microparticles preferably have a primary average particle size of 20 nm or less, as well as an apparent specific gravity of 70 g/liter or greater. It is more preferable that the average diameter of the primary particle is small in the range of 5 to 16 nm, in view of lowering the haze of the film. The apparent specific gravity is preferably 90 to 200 g/liter or larger, and more preferably 100 to 200 g/liter or larger. As the apparent specific gravity is larger, it is possible to prepare a dispersion of higher concentration, and thus haze and aggregate become good, which is preferable.

These microparticles form secondary particles having an average particle size of usually 0.1 to 3.0 μm, and these microparticles exist as aggregates of primary particles in the film, thus forming irregularities in the range of 0.1 to 3.0 μm on the film surface. The average particle size of the secondary particle is preferably in the range of 0.2 μm to 1.5 μm, more preferably in the range of 0.4 μm to 1.2 μm, and most preferably in the range of 0.6 μm to 1.1 μm. The particle size of the primary and secondary particles were determined by observing a particle with a scanning electron microscope and taking the diameter of a circle circumscribing the particle as the particle size. Further, 200 particles at varying sites were observed, and the average value was taken as the average particle size.

For silicon dioxide microparticles, commercially available products such as, for example, Aerosil R972, R972V, R974, R812, 200, 200V, 300, R202, OX50, TT600 (all available from Nippon Aerosil Co., Ltd.) and the like can be used. Zirconium oxide microparticles that can be used are commercially available under the tradename of Aerosil R976 and R811 (all available from Nippon Aerosil Co., Ltd.).

Among these, Aerosil 200V and Aerosil R972V are silicon dioxide microparticles having a primary average particle size of 20 nm or less, and also an apparent specific gravity of 70 g/liter or larger. They have a significant effect of lowering the friction coefficient while maintaining the turbidity of an optical film low, and thus they are particularly preferable.

According to an aspect of the invention, in order to obtain an optical resin film having particles of small secondary average particle size, several techniques for preparing a dispersion of microparticles can be considered. For example, a method of preparing in advance a microparticle dispersion having a solvent and microparticles mixed with stirring, adding this microparticle dispersion to a small amount of separately prepared cellulose acylate solution, dissolving the mixture with stirring, and mixing the resulting solution with the remaining large amount of the cellulose acylate solution (dope solution), is available. This method is a preferred preparation method from the viewpoint that since the dispersibility of silicon dioxide is good, silicon dioxide microparticles have difficulties in undergoing further re-aggregation. In addition to that, there is available a method of adding a small amount of cellulose ester to a solvent, dissolving the cellulose ester with stirring, then adding microparticles to the resulting solution and dispersing with a disperser to obtain a microparticulate additive liquid, and sufficiently mixing this microparticulate additive liquid with a dope solution using an in-line mixer. The present invention is not limited to these methods, but the concentration of silicon dioxide upon mixing and dispersing the silicon dioxide microparticles with a solvent or the like is preferably 5 to 30% by weight, more preferably 10 to 25% by weight, and most preferably 15 to 20% by weight. When the dispersion concentration is high, the liquid turbidity relative to the amount of addition decreases, and the haze and aggregate become good, which is preferable. The amount of addition of the matting agent microparticles in the final cellulose acylate dope solution is preferably 0.01 to 1.0 g, more preferably 0.03 to 0.3 g, and most preferably 0.08 to 0.16 g, per 1 $m^3$.

The solvent to be used for preparing an optical resin film by solution film formation may be exemplified by lower alcohols, preferably methyl alcohol, ethyl alcohol, propyl alcohol, isopropyl alcohol, butyl alcohol or the like. Solvents other than the lower alcohols are not particularly limited, but it is preferable to use a solvent that is used for the formation of cellulose ester film.

(Plasticizer, Deterioration Preventing Agent, Peeling Agent)

In addition to the compound reducing optical anisotropy and the wavelength dispersion regulator, the optical resin film of the invention may contain various additives in accordance with the use (for example, a plasticizer, a ultraviolet blocking agent, deterioration preventing agent, peeling agent, infrared absorbent, etc.), as described above, and these additives may be solid or oily matter. That is, the additives are not particularly limited in the aspect of the melting point or boiling point. For example, ultraviolet absorbing materials of 20° C. or higher and of 20° C. or lower may be mixed, and plasticizers also may be mixed likewise, and they are described in JP-A-2001-151901 and the like, for example. Further, infrared absorbents are described in, for example, JP-A-2001-194522. The time of the addition may be at any time during the dope preparation process, but it is desirable to add the additives at the final step of the dope preparation process. The amount of addition of each additive is not particularly limited, as long as the function is exhibited. In the case where a cellulose acylate film is formed in multilayer, the type or amount of addition of the additives in each layer may be different. For example, the techniques are described in JP-A-2001-151902 and the like, and they are traditionally known techniques. For details of the additives, the materials described in detail in the Technical Report of Japan Institute of Invention and Innovation (Innovation Journal of Technical Disclosure No. 2001-1745, published on Mar. 15, 2001 by Japan Institute of Invention and Innovation), pp. 16-22, are favorably used.

(Ratio of Compound Addition)

For the optical resin film of the invention, the total amount of the compound having a molecular weight of 3,000 or less is preferably 5 to 45% with respect to the weight of solid contents (mainly polymer) of the film. The total amount is more preferably 10 to 40%, and even more preferably 15 to 30%. The compound may be exemplified, as described above, by a compound reducing optical anisotropy, a wavelength dispersion controlling agent, an ultraviolet blocking agent, a plasticizer, a deterioration preventing agent, a microparticle, a peeling agent, an infrared absorbent or the like. Molecular weight of the compound is preferably 3,000 or less, more preferably 2,000 or less, and even more preferably 1000 or less. When the total amount of these compounds is less than 5% by weight, the properties of the elemental cellulose acylate substance are likely to be exhibited, and there is a problem that, for example, the optical performance or physical strength is susceptible to fluctuate with the change in temperature or humidity, or the like. Furthermore, when the total amount of these compounds exceeds 45% by weight, the compatibility of the compounds in the cellulose acylate film goes beyond the limit, and thus the compounds are likely to cause problems such as that the compounds precipitate out on the film surface to result in clouding of the film (bleeding from the film), and the like.

To establish the desired optical performance, the optical resin film of the invention can preferably contain an Re expressing agent or an Rth expressing agent. In order to obtain the desired wavelength dispersion properties represented by the above formulae (A), (B), (C) and (D), it is particularly preferable to that the optical resin film contains an appropriate Re expressing agent or an appropriate Rth expressing agent.

Now, the Re expressing agent and the Rth expressing agent will be described in greater detail.

From the viewpoint of preventing the film from unnecessary coloration, it is preferable that the Re expressing agent in the invention has a molar absorptivity of 1000 or less within a wavelength range of from 350 nm to 800 nm. It is still preferable that the molar absorptivity thereof within a wavelength range of from 330 nm to 800 nm is 1000 or less.

To regulate the absolute value of Re of the optical resin film of the invention, it is also preferable to use a compound which has a maximum absorption wavelength (λmax) shorter than 250 nm in the UV absorption spectrum of a solution as a retardation raising agent. By using such a compound, the absolute value can be regulated without causing a substantial change in the wavelength dependency of Re in the visible region.

The term "retardation expressing agent" means such an "additive" that the Re retardation value of an optical resin film, which contains the additive, measured at a wavelength of 550 nm is higher by 20 nm or more than the Re retardation value of another optical resin film which is produced in the same manner but not using the additive. The raise in the retardation value is preferably 25 nm or more, still preferably 30 nm or more and most preferably 35 nm or more.

From the viewpoint of the function as a retardation raising agent, a rod-shaped compound is preferable and a compound having at least one aromatic ring is preferred and a compound having at least two aromatic rings is more preferred.

A rod-shaped compound having a linear molecular structure is preferred. The term "linear molecular structure" means that the molecular structure of a rod-shaped compound is linear in the thermodynamically most stable structure thereof. The thermodynamically most stable structure can be determined by analyzing crystalline structure or computing molecular orbital. Namely, the molecular structure wherein the heat of the formation of the compound attains the minimum level can be determined by computing the molecular orbital with the use of, for example, a molecular orbit computing software (for example, Win MOPAC 2000 manufactured by FUJITSU). A linear molecular structure means that, in the thermodynamically most stable state computed as described above, the angle of the molecular structure is 140 degree above.

As the Re expressing gent in the invention, use can be preferably made of the rod-shaped aromatic compounds cited in JP-A-2004-50516, pages 11 to 14.

Also, use can be preferably made of the rod-shaped compounds described in JP-A-2005-134863.

It is preferable that the rod-shaped compound shows liquid crystallinity. It is more preferred that the rod-shaped compound shows liquid crystallinity when heated (i.e., having thermotropic liquid crystallinity). As the liquid crystal phase, a nematic phase or a smectic phase is preferred.

Although preferable compounds are described in JP-A-2004-4550, the invention is not restricted thereto. Use may be also made of two or more rod-shaped compounds each having a maximum absorption wavelength (λmax) shorter than 250 nm in the UV absorption spectrum of a solution thereof.

Rod-shaped compounds can be synthesized by referring to methods reported in documents. As the documents, there can be enumerated Mol. Cryst. Liq. Cyrst., vol. 53, p. 229 (1979); ibid. vol. 89, p. 93 (1982); ibid. vol. 145, p. 111 (1987); ibid. vol. 170, p. 43 (1989); J. Am. Chem. Soc., vol. 113, p. 1349 (1991); ibid. vol. 118, p. 5346 (1996); ibid. vol. 92, p. 1582 (1970); J. Org. Chem., vol. 40, p. 420 (1975); and Tetrahedron, vol. 49, No. 16, p. 3437 (1992).

In the invention, either a single Re expressing agent or a mixture of two or more thereof may be used. In the invention, it is preferable to add the Re expressing agent in an amount of from 0.1 to 30% by mass (or weight), more preferably from 0.5 to 20% by mass, per 100 parts by mass of the polymer.

Concerning the method of adding the Re expressing agent in the invention, the Re expressing agent may be dissolved in an organic solvent such as an alcohol, methylene chloride or dioxolane and then added to the dope. Alternatively, it may be directly added to the dope composition.

(Rth Expressing Agent)

To achieve a desired Rth retardation value, it is preferable to use an Rth expressing agent.

The term "retardation expressing agent" means such an "additive" that the Rth retardation value of an optical resin film, which contains the additive, measured at a wavelength of 550 nm is higher by 20 nm or more than the Rth retardation value of another optical resin film which is produced in the same manner but not using the additive. The raise in the retardation value is preferably 30 nm or more, still preferably 40 nm or more and most preferably 60 nm or more.

It is preferable that the Rth expressing agent is a compound having at least two aromatic rings. It is preferable that the Rth expressing agent is used in an amount of from 0.01 to 20 parts by mass, more preferably form 0.1 to 15 parts by mass, more preferably from 0.2 to 10 parts by mass and most preferably from 0.5 to 8 parts by mass, per 100 parts by mass of the polymer. Use may be made of a combination of two or more retardation rising agents.

It is preferable that the Rth expressing agent has an absorption peak within a wavelength region of from 250 to 400 nm and it is also preferable that the Rth expressing agent has substantially no absorption in the visible region.

It is preferred that the Rth expressing agent would not affect Re expressed by stretching and use is preferably made of a discotic compound therefor.

As the discotic compound, a compound having, in addition to an aromatic hydrocarbon ring, an aromatic heterocycle and it is particularly preferable that the aromatic hydrocarbon ring is a 6-membered ring (i.e., a benzene ring). In general, an aromatic heterocycle is an unsaturated heterocycle. As the aromatic heterocycle, a 5-membered ring, a 6-membered ring or a 7-membered ring is preferable and a 5-membered ring or a 6-membered ring is more preferable. An aromatic heterocycle generally has the largest number of double bonds. As the hetero atom, a nitrogen atom, an oxygen atom and a sulfur atom are preferable and a nitrogen atom is particularly preferable. Examples of the aromatic heterocycle include a furan ring, a thiophene ring, a pyrrole ring, an oxazole ring, an isooxazole ring, a thiazole ring, an isothiazole ring, an imidazole ring, a pyrazole ring, a furazane ring, a triazole ring, a pyran ring, a pyridine ring, a pyridazine ring, a pyrimidine ring, a pyrazine ring and a 1,3,5-triazine ring.

As the aromatic ring, a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring are preferable. In particular, it is preferable to use a 1,3,5-triazine ring. More specifically speaking, use may be preferably made of, for example, the compounds disclosed in JP-A-2001-166144.

The aromatic compound is used in an amount of from 0.01 to 20 parts by mass per 100 parts by mass of the polymer. It is preferable to use the aromatic compound in an amount of from 0.05 to 15 parts by mass, more preferably from 0.1 to 10 parts by mass, per 100 parts by mass of the polymer. Use may be made of a combination of two or more compounds.

(Method of Regulating Rth: Method using Optically Anisotropic Layer)

As another method for achieving the desired optical performance represented by the above formulae (A), (B), (C) and (D), it is preferable to employ a method of forming an optically anisotropic layer such as a liquid crystal layer.

As the liquid crystal compound to be used in forming the optically anisotropic layer, there can be enumerated a rod-shaped liquid crystal compound and a discotic liquid crystal compound (hereinafter, a discotic liquid crystal compound will be sometimes called "a discotic liquid crystal compound" too). The rod-shaped liquid crystal compound and the discotic liquid crystal compound may be either high-molecular liquid crystals or low-molecular liquid crystals. The compound finally contained in the optically anisotropic layer would not necessarily show liquid crystallinity any more. In the case of using a low-molecular liquid crystal compound in forming the optically anisotropic layer, for example, the compound may be crosslinked in the course of the formation of the optically anisotropic layer and show no liquid crystallinity any longer.

(Rod-Shaped Liquid Crystal Compound)

As the rod-shaped liquid crystal compound usable in the invention, use may be preferably made of azomethines, azoxys, cyanobiphenyls, cyanophenyl esters, benzoic acid esters, cyclohexanecarboxlic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles. Metal complexes also fall within the category of the rod-shaped liquid crystal compound. Moreover, use may be made of a liquid crystal polymer containing a rod-shaped liquid crystal compound in its repeating unit. In other words, the rod-shaped liquid crystal compound may be bonded to a (liquid crystal) polymer.

Rod-shaped liquid crystal compounds are described in ed. by Nihon Kagaku-kai, *Kikan Kagaku Sosetsu*, No. 22, *Ekisho no Kagaku*, cahp. 5, chap. 10, par. 2 (1994); and ed. by *Nihon Gakujutsu Shinkokai Dai* 142 *Iinkai, Ekisho Debaisu Handobukku*, chap. 3.

It is preferable that the birefringent index of the rod-shaped liquid crystal compound to be used in the invention ranges from 0.001 to 0.7.

To fix the orientated state, it is preferable that the rod-shaped liquid crystal compound has a polymerizable group. As the polymerizable group, an unsaturated polymerizable group or an epoxy group is preferred, an unsaturated polymerizable group is more preferred and an ethylenically unsaturated polymerizable group is most preferred.

(Discotic Liquid Crystal Compound)

Examples of the discotic liquid crystal compound usable in the invention include benzene derivatives reported by C. Destrade et al., Mol. Cryst. Cryst., vol. 71, p. 111 (1981); truxene derivatives reported by C. Destrade et al., Mol. Cryst., vol. 122, p. 141 (1985) and Physics Lett., A, vol. 78, p. 82 (1990); cyclohexane derivatives reported by B. Kohne et al., Angew. Chem. vol. 96, p. 70 (1984); and azacrown type and phenylacetylene type macrocycles reported by J. M. Lehn et al., J. Chem. Commun., p. 1974 (1985) and J. Zhang et al., J. Am. Chem., Soc., vol. 116, p. 2655 (1994).

The discotic liquid crystal compounds as described above include a compound showing liquid crystallinity in which linear alkyl groups, alkoxy groups or substituted benzoyloxy substituents are radially attached as side chains to the mother nucleus at the molecular center. A compound which has rotational symmetry, as a molecule or a mass of molecules, and can impart definite orientation is preferable.

In the case of forming an optically anisotropic layer made of a liquid crystal compound as discussed above, the compound finally contained in the optically anisotropic layer would not necessarily show liquid crystallinity any more. When a low-molecule liquid crystal compound has a heat- or light-reactive group and undergoes polymerization or crosslinkage by the reaction of this group due to heat or light to give a high-molecule compound thereby forming an optically anisotropic layer, for example, the compound contained in the optically anisotropic layer may not sustain its liquid crystal properties any longer. Preferable examples of the discotic liquid crystal compound is cited in JP-A-8-50206. Polymerization of the discotic liquid crystal compound is mentioned in JP-A-8-27284.

To fix the discotic liquid crystal compound by polymerization, a polymerizable group should be bonded as a substituent to the discotic core of the discotic liquid crystal compound. When a polymerizable group is bonded to the discotic core, however, it becomes difficult to sustain the orientated state during the polymerization. Therefore, it is preferable to introduce a linking group between the discotic core and the polymerizable group.

In the invention, molecules of the rod-shaped compound or the discotic liquid crystal compound are fixed in the orientated state in the optically anisotropic layer. The orientation average direction at the interface in the optical film side of the molecular symmetry axis of the liquid crystal compound intersects the in-plane slow axis of the optical film at an angle of about 45°. The expression "about 45°" as used herein means an angle falling within the range 45°±5°, preferably from 42 to 48° and more preferably from 43 to 47°.

The orientation average direction of the molecular symmetry axis of the liquid crystal compound can be controlled generally by selecting an appropriate liquid crystal compound or a material for the orientation film or selecting an appropriate rubbing method.

In the case of, for example, producing an optically compensatory film of the OCB type in the invention, an orientation film for forming the optically anisotropic layer is produced by rubbing. By conducting the rubbing treatment in the direction at 45° to the slow axis of the optical film, it is possible to form an optically anisotropic layer wherein the orientation average direction at the interface in the film side of the molecular symmetry axis of the liquid crystal compound is located at an angle of 45° to the in-plane slow axis of the film.

For example, the optically compensatory film of the invention can be continuously produced by using the optical film of the invention in long sheet type wherein the slow axis is orthogonal to the traveling direction. More specifically speaking, a coating solution for forming orientation film is continuously applied to the surface of the optical film in long sheet type to form a film. Next, the surface of the film is rubbed at an angle of 45° in the traveling direction to form an orientation film. Then a coating solution for forming optically anisotropic layer, which contains a liquid crystal compound, is continuously applied to the orientation film thus formed and the liquid crystal molecules are orientated and fixed to this state, thereby forming an optically anisotropic layer. Thus, an optically compensatory film in long sheet type can be continuously formed. The obtained optically compensatory film in long sheet type is cut into a desired shape before introducing into a liquid crystal display.

Concerning the orientation average direction at the liquid crystal compound surface side (atmosphere side) of the molecular symmetry axis of the liquid crystal compound, the orientation average direction at the atmosphere interface side of the molecular symmetry axis of the liquid crystal compound is preferably located at an angle of about 45° to the slow axis of the optical resin film, more preferably from 42 to 48° and more preferably from 43 to 47°. The orientation average direction at the atmosphere interface side of the molecular symmetry axis of the liquid crystal compound can be controlled by selecting an appropriate liquid crystal compound or the type of an additive to be used together with the liquid crystal compound. Examples of the additive to be used together with the liquid crystal compound include a plasticizer, a surfactant, a polymerizable monomer, a polymer and so on. Similarly, the extent of change in the orientation direction of the molecular symmetry axis can be controlled by appropriately selecting a liquid crystal compound and an additive as discussed above. With respect to a surfactant, it is particularly preferable that a surfactant also contributes to the control of the surface tension of the coating solution as described above.

It is preferable that a plasticizer, a surfactant and a polymerizable monomer to be used together with the liquid crystal compound are compatible with the discotic liquid crystal compound and can impart a change in the tilt angle of the liquid crystal or not inhibit the orientation thereof. Use is preferably made of a polymerizable monomer (for example, compounds having a vinyl group, a vinyloxy group, an acryloyl group and a methacryloyl group). Such a compound is added in an amount of generally from 1 to 50% by mass, preferably from 5 to 30% by mass, based on the liquid crystal compound. By using a mixture of monomers having 4 or more polymerizable and reactive functional groups, the adhesiveness between the orientation film and the optically anisotropic layer can be elevated.

(Orientation Film)

To form an optically anisotropic layer, the optical resin film of the invention may have an orientation film. It is also possible that an orientation film is used exclusively in forming the optically anisotropic layer and, after forming the optically anisotropic layer on the orientation film, the optically anisotropic layer alone is transferred onto the optical resin film of the invention.

It is preferable in the invention that the orientation film is a layer made of a crosslinked polymer. The polymer to be used in the orientation film may be either a polymer being crosslinkable per se or a polymer undergoing crosslinkage by using a crosslinking agent. The orientation film is formed by reacting molecules of a polymer having a functional group or a polymer, into which a functional group has been introduced, due to light, heat, pH change, etc. Alternatively, the orientation film can be formed by crosslinking polymer molecules by using a crosslinking agent which is a highly reactive compound and introducing a binding group originating in the crosslinking agent into the polymer molecules.

The orientation film made of the crosslinked polymer can be usually formed by applying a coating solution, which contains the above-described polymer or a mixture of the polymer with the crosslinking agent, on a support followed by, for example, heating.

To prevent dusting in the orientation film in the rubbing step as will be mentioned hereinafter, it is preferable to elevate the degree of crosslinkage. When the degree of crosslinkage is defined as a value calculated by subtracting the ratio (Ma/Mb) (wherein Mb stands for the amount of the crosslinking agent added to the coating solution; and Ma stands for the amount of the crosslinking agent remaining after the completion of the crosslinkage) from 1 (1-(Ma/Mb)), the degree of crosslinkage preferably ranges from 50% to 100%, more preferably from 65% to 100% and most preferably from 75% to 100%.

The polymer to be used in the orientation film in the invention may be either a polymer which is crosslinkable per se or a polymer which is crosslinked by a crosslinking agent. Needless to say, it is also possible to use a polymer having both of these functions. As these polymers, there can be enumerated polymers such as polymethyl methacrylate, acrylic acid/methacrylic acid copolymer, styrene/maleimide copolymer, polyvinyl alcohol and denatured polyvinyl alcohol, poly(N-methylolacrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethylcellulose, gelatin, polyethylene, polypropylene and polycarbonate and compounds such as a silane coupling agent. Preferable examples of the polymers include water-soluble polymers such as poly(N-methylolacrylamide), carboxymethylcellulose, gelatin, polyvinyl alcohol and denatured polyvinyl alcohol. Gelatin, polyvinyl alcohol and denatured polyvinyl alcohol are more preferable and polyvinyl alcohol and denatured polyvinyl alcohol are particularly preferable.

In the case of applying polyvinyl alcohol and denatured polyvinyl alcohol directly onto the optical resin film of the invention, use may be preferably made of the method of forming a hydrophilic undercoat layer or conducting a saponification treatment.

Among the polymers as cited above, polyvinyl alcohol or denatured polyvinyl alcohol is preferred.

There are polyvinyl alcohols having degree of saponification of, for example, from 70 to 100%. Those having degree of saponification of from 80 to 100% are generally preferable and those having degree of saponification of from 82 to 98% are more preferable. Polyvinyl alcohols having degree of polymerization of from 100 to 3,000 are preferred.

As the denatured polyvinyl alcohol, there can be enumerated those denatured by copolymerization (for example, having a denaturation group such as COONa, $Si(OX)_3$, $N(CH_3)_3$Cl, $C_9H_{10}COO$, $SO_3Na$, $C_{12}H_{25}$, etc. introduced thereinto), those denatured by chain transfer (for example, having a denaturation group such as COONa, SH, $SC_{12}H_{25}$, etc. introduced thereinto) and those denatured by block polymerization (for example, having a denaturation group such as COOH, $CONH_2$, COOR, $C_6H_5$, etc.). Denatured polyvinyl alcohols having degree of polymerization of from 100 to 3000 are preferred. Among them, an undenatured or denatured polyvinyl alcohol having a degree of saponification of from 80 to 100% is preferable and an undenatured or altkylthio-denatured polyvinyl alcohol having a degree of saponification of from 85 to 95% is more preferable.

To impart a favorable adhesiveness between the optical resin film and the optically anisotropic layer made of the liquid crystal, it is preferable to introduce a crosslinking/polymerization active group into the polyvinyl alcohol. Preferable examples thereof are mentioned in detail in JP-A-8-338913.

In the case of using a hydrophilic polymer such as polyvinyl alcohol in the orientation film, it is preferable to regulate the moisture content thereof from the viewpoint of film hardness. Namely, the moisture content preferably ranges from 0.4% to 2.5%, more preferably from 0.6 to 1.6%. The moisture content can be measured by a marketed moisture content meter of the Karl Fischer method.

It is preferable that the orientation film has a film thickness of 10 μm or less.

(Film Formation using Melting State)

The method of producing the optical resin film of the invention may be the film formation method using melting state. Individual materials may be melted by heating and then extruded to give a film by extrusion molding. Alternatively, the materials may be sandwiched between two hot plates and shaped into a film by press processing.

The melting temperature is not particularly restricted, so long as the polymers employed are uniformly melted together at that temperature. More specifically speaking, the polymers are heated to a temperature higher than the melting temperature or the softening temperature. To obtain a uniform film, it is preferable to melt a polymer at a temperature higher than the melting temperature of the polymer, preferably a temperature higher by 5 to 40° C. than the melting temperature and particularly preferably a temperature higher by 8 to 30° C. than the melting temperature.

(Organic Solution of Polymer Solution)

As discussed above, the optical resin film of the invention may be produced by using the solvent cast method. Production by the solvent cast method is preferred to achieve favorable planar conditions of the optical resin film thus formed. In this method, a film is produced by using a solution comprising a polymer dissolved in an organic solvent (a dope).

As preferable examples of organic solvents to be used as the main solvent in the invention, use may be preferably made of solvents selected from among esters, ketones and ethers having from 3 to 12 carbon atoms and halogenated hydrocarbons having from 1 to 7 carbon atoms. These esters, ketones and ethers may have cyclic structure. It is also possible to use, as the main solvent, compounds having two or more functional groups (i.e., —O—, —CO— and —COO—) of esters, ketones and ethers and these compounds may have another functional group such as alcoholic hydroxyl group at the same time. In the case of a main solvent having two or more types of functional groups, the carbon atom number falling within the range as specified above concerning a compound having one of the functional groups.

As described above, the optical resin film of the invention may comprise, as the main solvent, either a chlorine-based halogenated hydrocarbon or a nonchlorinated organic solvent as described in Japan Institute of Invention and Innovation Journal of Technical Disclosure No. 2001-1745 (p. 12 to 16). The optical resin film of the invention is not restricted thereto.

Other solvents and dissolution methods therefore are disclosed in the following patents which are preferred embodiments: for example, JP-A-2000-95876, JP-A-12-95877, JP-A-10-324774, JP-A-8-152514, JP-A-10-330538, JP-A-9-95538, JP-A-9-95557, JP-A-10-235664, JP-A-12-63534, JP-A-11-21379, JP-A-10-182853, JP-A-10-278056, JP-A-10-279702, JP-A-10-323853, JP-A-10-237816, JP-A-11-60807, JP-A-11-152342, JP-A-11-292988, JP-A-11-60752 and so on. According to these patents, not only preferable solvents but also solution properties thereof and substances to coexist are reported, thereby presenting preferred embodiments of the invention.

(Process for Producing Optical Resin Film by Solution Film Formation)

Next, the steps for producing the optical resin film of the invention by the solution film formation method will be illustrated in greater detail.

(Dissolution Step)

In preparing a polymer solution (dope), the polymer is dissolved by an arbitrary method without restriction, i.e., by room-temperature dissolution, cold dissolution, hot dissolution or a combination thereof. Concerning the preparation of the polymer solution according to the invention, concentration of the solution in association with the dissolution and filtration, it is preferable to employ the process described in, for example, Japan Institute of Invention and Innovation Journal of Technical Disclosure No. 2001-1745 (Mar. 15, 2001, Japan Institute of Invention and Innovation), p. 22 to 25.

(Transparency of Dope Solution)

It is preferable that the transparency of the dope of the polymer solution according to the invention is 85% or higher, more preferably 88% or higher and more preferably 90% or higher. In the invention, it is confirmed that various additives have been sufficiently dissolved in the polymer dope solution. The dope transparency in practice is determined by pouring the dope solution into a glass cell (1 cm×1 cm), measuring the absorbance at 550 nm with a spectrophotometer (UV-3150, manufactured by Shimadzu), separately measuring the solvent alone as a blank, and then calculating the transparency based on the ratio to the absorbance of the blank.

(Casting, Drying and Winding Steps)

Next, a method of producing a film by using the polymer solution will be illustrated. Concerning a film-forming method and apparatus for producing the optical resin film, use can be made of the solvent cast film-forming method and a solvent cast film-forming apparatus conventionally employed in forming cellulose triacetate films. A dope (a polymer solution) prepared in a dissolution machine (a pot) is once stored in a storage pot and, after defoaming, the dope is subjected to the final preparation. Then the dope is discharged from a dope exhaust and fed into a pressure die via, for example, a pressure constant-rate pump whereby the dope can be fed at a constant rate at a high accuracy depending on the rotational speed. From the pipe sleeve (slit) of the pressure die, the dope is uniformly cast onto a metallic support continuously running in the casting section. At the peeling point where the metallic support has almost rounded, the half-dried dope film (also called a web) is stripped off from the metallic support. The obtained web is clipped at both ends and dried by carrying with a tenter while maintaining the width at a constant level. Subsequently, it is carried with rolls in a dryer to terminate the drying and then wound with a winder in a definite length. Combination of the tenter and the rolls in the dryer may vary depending on the purpose. In the solvent cast film-forming method to produce functional protective films for electronic displays or silver halide photosensitive materials (i.e., the main uses of the optical resin film of the invention), a coater is frequently employed, in addition to the solvent cast film-forming apparatus, so as to process the film surface by providing, for example, an undercoating layer, an antistatic layer, an anti-halation layer or a protective layer. These layers are described in detail in Japan Institute of Invention and Innovation Journal of Technical Disclosure No. 2001-1745 (Mar. 15, 2001, Japan Institute of Invention and Innovation), p. 25 to 30. The techniques given in this document, which are itemized as casting (including co-casting), metallic supports, drying, peeling and so on, are preferably usable in the invention.

(Stretching)

The desired optical characteristics of the optical resin film of the invention, in particular, the characteristics represented by the above formulae (A), (B), (C) and (D) can be established by the stretching method too.

Use can be made of the methods described in, for example, JP-A-62-115035, JP-A-4-152125, JP-A-4-284211, JP-A-4-298310, and JP-A-11-48271.

The stretching of the film is carried out at the normal temperature or under a heating condition. The film may be uniaxially stretched in the lengthwise or widthwise direction. Alternatively, it may be simultaneously or successively biaxially stretched. The stretching magnification of the film is from 1 to 200%, preferably from 1% to 100%, and more preferably from 1% to 50%. Concerning the birefringence of the optical resin film, it is preferable that the widthwise refractive index is larger than the lengthwise refractive index. Accordingly, it is preferred to stretch the film at a larger magnification in the widthwise direction. The stretching treatment may be conducted in the course of film formation. Alternatively, the wound raw film may be stretched. In the former case, the stretching may be conducted on the film still containing the residual solvent therein. The stretching can be favorably carried out at a residual solvent content of from 2 to 30%.

To produce such a film having the optical characteristics represented by the above formulae (A) to (D) as in the invention, it is preferable to conduct freely uniaxially stretching to arise neck-in. This is because neck-in contributes to the elevation in the degree of orientation in the stretching direction. In this case, it is also preferable to stretch at a high temperature to elevate the degree of orientation. Namely, the stretching temperature preferably ranges from 155 to 210° C., more preferably from 160 to 210° C. and particularly preferably from 165 to 210° C.

It is also preferable that the film is stretched widthwise and then relieved in the traveling direction. It is preferable to stretch the optical resin film in the direction at an angle of 80 to 100° to the traveling direction and then relieve in the traveling direction. This is seemingly because the same effects as those established by the freely uniaxially stretching as described above can be thus obtained. The degree of relieving in the traveling direction is preferably from 10 to 40%, more preferably from 12% to 40% and particularly preferably from 15% to 40%.

(Drying and Winding)

The obtained web is clipped at both ends and dried by carrying with a tenter while maintaining the width at a constant level. Subsequently, it is carried with rolls in a dryer to terminate the drying and then wound with a winder in a definite length. Combination of the tenter and the rolls in the dryer may vary depending on the purpose.

The width of the optical resin film thus obtained preferably ranges from 0.5 to 3 m, more preferably from 0.6 to 2.5 m and more preferably from 0.8 to 2.2 m. Concerning the length, it is preferable to wind up the optical resin film in a length of 100 to 10,000 m, more preferably form 500 to 7,000 m and more preferably from 1,000 to 6,000 m, per roll. In the winding step, it is preferable to provide a knurling to at least one end. The knurling width is preferably from 3 mm to 50 mm, more preferably from 5 mm to 30 mm, while the height thereof is preferably form 0.5 to 500 μm, more preferably from 1 to 200 μm. It may be either single- or double-forced.

(Optical Characteristics of Film)

It is preferable that Re(590) and Rth(590) of the optical resin film fulfill formulae (I) and (II).

$$20 \text{ nm} \leq Re(590) \leq 200 \text{ nm} \quad (I)$$

$$70 \text{ nm} \leq Rth(590) \leq 400 \text{ nm} \quad (II)$$

It is more preferable that 30 nm≦Re(590)≦160 nm and 100 nm≦Rth(590)≦350 nm.

The variation in Re(590) in the widthwise direction of the film is preferably within ±5 nm, more preferably within ±3 nm. The variation in Rth(590) in the widthwise direction is preferably within ±10 nm, more preferably within ±5 nm. Similarly, it is preferred that the variations in the Re value and Rth value in the lengthwise direction fall within the same ranges as the variations in the widthwise direction.

(Evaluation of Physical Properties of Optical Resin Film)

(Glass Transition Temperature Tg of Film)

The glass transition temperature Tg of the optical resin film of the invention is 80 to 165° C. From the viewpoint of heat resistance, Tg is more preferably 100 to 160° C., and particularly preferably 110 to 150° C. Measurement of the glass transition temperature Tg is carried out by subjecting 10 mg of a sample of the cellulose acylate film of the invention to calorie measurement using a differential scanning calorimeter (for example, DSC2910, TA Instruments, Inc.), from ambient temperature to 200° C. at a temperature elevating or lowering rate of 5° C./min, thus to determine the glass transition temperature Tg.

(Haze of Film)

The haze of the optical resin film of the invention is preferably 0.0% to 2.0%, more preferably 0.0% to 1.5%, and even more preferably 0.0% to 1.0%. Transparency of the film is important when used as an optical film. Measurement of the haze is carried out according to JIS K-6714, using a sample of the cellulose acylate film of the invention having a size of 40 mm×80 mm, with a haze meter (HGM-2DP, Suga Test Instruments Co., Ltd.) at 25° C. and 60% RH.

(Humidity-Dependency of Re and Rth of Film)

It is preferable that the in-plane retardation Re and the thickness-direction retardation Rth of the optical resin film of the invention both suffer little change depending on humidity. More specifically, it is preferred that the difference (ΔRth) between Rth value at 25° C. and 100% RH and the Rth value at 25° C. and 80% RH (i.e., ΔRth=Rth100% RH−Rth80% RH) is from 0 to 50 nm, more preferably from 0 to 40 nm and more preferably from 0 to 35 nm.

(Equilibrium Water Content of Film)

The equilibrium water content of the optical resin film of the invention is such that the equilibrium water content at 25° C. and 80% RH, regardless of the film thickness, is preferably 0 to 4%, more preferably 0.1 to 3.5%, and particularly preferably 1 to 3%, in order not to impair the adhesiveness of the optical resin film to water-soluble polymers such as polyvinyl alcohol and the like when the optical resin film is used as a protective film for polarizing plate. When the equilibrium water content is 4% or greater, the dependency of the retardation on humidity change increases excessively, which is not preferred.

The water content was measured according to the Karl-Fisher method, using a sample of the optical resin film of the invention having a size of 7 mm×35 mm, with a moisture meter and a sample drying apparatus (CA-03 and VA-05, all by Mitsubishi Chemical Corporation). The amount of moisture (g) was calculated by dividing by the sample mass (g).

(Moisture Permeability of Film)

The moisture permeability of the optical resin film of the invention is measured on the basis of JIS Standards JIS Z0208 under the conditions of a temperature of 60° C. and a humidity of 95% RH, and the moisture permeability value is preferably 0 to 400 g/m²·24 h, more preferably 0 to 350 g/m²·24 h, and particularly preferably 0 to 300 g/m²·24 h, as normalized to the moisture permeability value of a 80 μm-thick film. When the film thickness of the optical resin film is large, the moisture permeability decreases, while when the film thickness is small, the moisture permeability increases. Thus, it is necessary to normalize samples having arbitrary film thicknesses to an 80 μm-thick film. Conversion of the film thickness can be conducted according to the formula: (moisture permeability after normalization to 80 μm=actually measured moisture permeability×actually measured film thickness μm/80 μm).

For the method of measuring moisture permeability, the method described in "Properties of Polymers II" (Lecture on Polymer Experimentation No. 4, Kyoritsu Shuppan Co., Ltd.), pp. 285-294: Measurement of amount of vapor permeation (mass method, thermometer method, vapor pressure method, adsorbed quantity method) can be applied. A sample of the cellulose acylate film of the invention having a size of 70 mmφ is humidified at 25° C. and 90% RH and at 60° C. and 95% RH for 24 hours, respectively, and the amount of moisture per unit area (g/m²) is determined according to JIS Z0208 using a moisture permeability testing apparatus (KK-709007, Toyo Seiki Kogyo Co., Ltd.). The moisture permeability is calculated by subtracting the mass before humidification from the mass after humidification.

(Change of Film Dimension)

The dimensional stability of the optical resin film of the invention is such that the rate of dimensional change in the case of conditioning the film at 60° C. and 90% RH for 24 hours (high humidity), and the rate of dimensional change in the case of conditioning the film at 90° C. and 5% RH for 24 hours (high temperature) are all preferably in the range of 0.5% or less, more preferably in the range of 0.3% or less, and even more preferably in the range of 0.15% or less.

For the specific measuring method, two sheets of optical resin film samples having 30 mm×120 mm are humidified at 25° C. and 60% RH for 24 hours, and holes of 6 mmφ are perforated at an interval of 100 mm at both edges of the film samples using an automatic pin gauge (Shinto Scientific Co., Ltd.), with this perforation interval being taken as the original dimension of perforation interval (L0). One sheet of the sample is conditioned at 60° C. and 90% RH for 24 hours, and then the dimension of perforation interval (L1) is measured. Another sheet of the sample is conditioned at 90° C. and 5% RH for 24 hours, and then the dimension of perforation interval (L2) is measured. All measurements of the perforation intervals are made to a minimum scale of 1/1,000 mm. The rates of dimensional change are determined by the formulas: Rate of dimensional change at 60° C. and 90% RH (high humidity)= {|L0−L1|/L0}×100 and Rate of dimensional change at 90° C. and 5% RH (high temperature)={|L0−L21/L0}×100.

(Modulus of Elasticity of Film)

(Modulus of Elasticity)

It is preferable that the modulus of elasticity of the optical resin film of the invention is from 150 to 500 kgf/mm$^2$, more preferably form 180 to 470 kgf/mm$^2$ and more preferably from 200 to 440 kgf/mm$^2$. The modulus of elasticity is determined in practice by measuring the stress at a 0.5% elongation at a tensile speed of 10%/min in an atmosphere at 23° C. and 70% RH with the use of a multipurpose tensile test machine STM T50BP (manufactured by TOYO BALDWIN).

(Coefficient of Photoelasticity of Film)

(Coefficient of Photoelasticity)

<Photoelasticity>

The coefficient of photoelasticity of the optical resin film of the invention is preferably not more than 50×10$^{-13}$ cm$^2$/dyne, and more preferably not more than 30×10$^{-13}$ cm$^2$/dyne and more preferably not more than 20×10$^{-13}$ cm$^2$/dyne. The coefficient of photoelasticity can be determined in practice by applying a tensile force in the major axis direction to a sample (12 mm×120 mm) of the optical resin film of the invention, measuring the retardation with an ellipsometer (M150 manufactured by JASCO ENGINEERING) and computing the coefficient of photoelasticity based on the change in the retardation due to the force.

(Method of Evaluating Optical Resin Film)

The optical resin film of the invention is evaluated in accordance with the following determination methods.

(Molecular Orientation Axis)

After conditioning a sample (70 mm×100 mm) at 25° C. and 60% RH for 2 hours, the molecular orientation axis is computed from the phase shift caused by altering the incident angle in perpendicular incidence with the use of an automatic double refractometer KOBRA 21 ADH (manufactured by OJI KEISOKU KIKI).

(Axis Shift)

Further, the axis shift angle is determined with the use of an automatic double refractometer KOBRA 21 ADH (manufactured by OJI KEISOKU KIKI). Measurement is made at 20 points located in the direction at constant intervals all over the width and the average of the absolute values is calculated. Concerning the range of the slow axis angle (axis shift), measurement is made at 20 points at constant intervals all over the width and the difference between the average of the largest 4 values and the average of the smallest 4 values is calculated.

(Transmittance)

The transmittance of visible light (615 nm) is measured using a sample having a size of 20 mm×70 mm at 25° C. and 60% RH with a diaphanometer (AKA photoelectric colorimeter, Kotaki Seisakusho Co., Ltd.).

(Spectroscopic Characteristics)

The transmittance of a sample (13 mm×40 mm) is determined at 300 to 450 nm in wavelength at 25° C. and 60% RH by using a spectrophotometer (U-3210, manufactured by HITACHI, Ltd.). Tilt width is determined as (wavelength at 72%−wavelength at 5%). Limiting wavelength is represented by (tilt width/2)+wavelength at 5%. Absorption end is expressed in the wavelength at the transmittance of 0.4%. Thus, the transmittances at 380 nm and 350 nm are evaluated.

(Nature of Film Surface)

(Surface Shape)

The surface of the cellulose acylate film of the invention is preferably such that the arithmetic average roughness (R$^a$) of the surface irregularity of the film based on JIS B0601-1994 is 0.1 μm or less, and the maximum height (Ry) is 0.5 μm or less. Preferably, the arithmetic average roughness (R$^a$) is 0.05 μm or less, and the maximum height (Ry) is 0.2 μm or less. The shapes of the concave and convex on the film surface can be evaluated using an atomic force microscope (AFM).

(Retentivity of Film)

The optical resin film of the invention is required to have retentivity for various compounds added to the film. Specifically, when the optical resing film of the invention is left to stand under the conditions of 80° C. and 90% RH for 48 hours, the change of film mass is preferably 0 to 5%, more preferably 0 to 3%, and even more preferably 0 to 2%.

<Evaluation Method for Retentivity>

A sample is cut to a size of 10 cm×10 cm, and after conditioning the sample under an ambience of 23° C. and 55% RH for 24 hours, the mass of the sample was measured. Then, the sample was left to stand under the conditions of 80±5° C. and 90±10% RH for 48 hours. The surface of the sample after conditioning was lightly wiped, and the mass of the sample after the conditioning at 23° C. and 55% RH for 1 day was measured, thus to calculate the retentivity by the following method:

Retentivity (mass %)={(mass before standing−mass after standing)/mass before standing}×100

(Dynamic Properties of Film)

(Curl)

The curl value in the width direction of the optical film of the invention is preferably −10/m to +10/m. For the optical resin film of the invention, when the below-described surface treatment or rubbing treatment upon coating of an optically anisotropic layer is carried out, or when coating or bonding of an alignment film or an optical anisotropic layer is carried out lengthwise, the value of curl in the width direction of the cellulose acylate film of the invention may cause difficulties in handling of the film outside the above-described range, thus causing breakage of the film. Also, as the film is brought into contact with the conveying roller at the edges or center of the film, dusting is likely to occur, and adherence of foreign matters on the film heavily occurs. Thus, the frequency of point defects or coating lines on the optical compensation film may exceed an acceptable value. Also, when the curl is adjusted to the above-described range, the failure in color unevenness that is likely to occur upon provision of the optically anisotropic layer can be reduced. In addition, upon bonding of the polarizing film, entrainment of air bubbles can be prevented, which is desirable.

The curl value can be measured according to the measuring method specified by the American National Standards Institute (ANSI/ASCPH1.29-1985).

(Tear Strength)

When the film thickness of the optical resin film of the invention is in the range of 20 to 80 μm, the tear strength value based on the tear testing method of JIS K7128-2: 1998 (Elmendorf tear method) is preferably 2 g or larger, more preferably 5 to 25 g, and even more preferably 6 to 25 g. The tear strength value normalized to that of a 60 μm-thick film is preferably 8 g or larger, and more preferably 8 to 15 g. Specifically, the tear strength can be measured after humidifying a sample specimen having a size of 50 mm×64 mm under the conditions of 25° C. and 65% RH for 2 hours, using a light load tear strength testing machine.

(Amount of Residual Solvent of Film)

The optical resin film of the invention is preferably dried under the conditions such that the amount of residual solvent falls within the range of 0.01 to 1.5% by weight, and more preferably 0.01 to 1.0% by weight. Bu adjusting the amount of residual solvent to 1.5% by weight, curling can be suppressed. It is even more preferable that the amount of residual solvent is 1.0% by weight. This is thought to be because when the amount of residual solvent upon film formation by the above-described solvent casting method, the free volume is decreased, and this is an important factor for the main optical and properties effects.

(Hygroscopic Expansion Coefficient of Film)

The hygroscopic expansion coefficient of the optical resin film of the invention is preferably $30 \times 10^{-5}$/% RH or less. The hygroscopic expansion coefficient is preferably $15 \times 10^{-5}$/% RH, and more preferably $10 \times 10^{-5}$/% RH. Also, it is preferable that the hygroscopic expansion coefficient is smaller, but its usual value is $1.0 \times 10^{-5}$/% RH or larger. The hygroscopic expansion coefficient indicates the amount of change in the sample length when the relative humidity is varied at a constant temperature. When the cellulose acylate film of the invention is used as the support for an optical compensation film, with the hygroscopic expansion coefficient being adjusted, a frame-shaped increase in the transmittance, that is, light leakage due to distortion, can be prevented while maintaining the optical compensation function of the optical compensation film.

(Surface Treatment of Film)

The optical resin film of the invention may be surface-treated in some cases to thereby improve the adhesion between the film and individual layers (for example, an undercoat layer and a back layer). As the surface treatment, use can be made of, for example, the glow discharge treatment, the UV irradiation treatment, the corona treatment, the flame treatment, an acid treatment or an alkali treatment. The glow discharge treatment as used herein may be conducted with the use of low-temperature plasma occurring under a low-pressure gas of $10^{-3}$ to 29 Torr. Alternatively, the plasma treatment under atmospheric pressure may be also preferably employed. As a plasma excitation gas which means a gas plasma-excited under the above conditions gas, there can be enumerated argon, helium, neon, krypton, xenon, nitrogen, carbon dioxide, flons such as tetrafluoromethane and mixtures thereof. These gases are described in detail in Japan Institute of Invention and Innovation Journal of Technical Disclosure No. 2001-1745 (Mar. 15, 2001, Japan Institute of Invention and Innovation), p. 30 to 32. The plasma-treatment under atmospheric pressure, which has attracted public attention in recent years, is conducted with the use of irradiation energy of, for example, from 20 to 500 Kgy at 10 to 1000 Kev, more preferably with the use of irradiation energy of 20 to 300 Kgy at 30 to 500 Kev. Among these methods, an alkali saponification treatment is particularly preferable because of being highly effective in surface-treating the film.

(Alkali Saponification Treatment)

The alkali saponification treatment is preferably carried out by the method of dipping the optical resin film directly in a tank containing a saponification solution or applying the saponification solution to the film. As the coating method, there can be enumerated the dip coating method, the curtain coating method, the extrusion coating method, the bar coating method and the E-type coating method. To apply the coating solution for alkali saponification to the film, it is preferable to select such a solvent for the saponification solution as having favorable wetting properties and being capable of sustaining favorable planar conditions without forming peaks and valleys on the film surface. More specifically speaking, it is preferable to use an alcoholic solvent and isopropyl alcohol is particularly preferable therefor. It is also possible to use an aqueous solution of a surfactant as the solvent. As the alkali to be used in the coating solution for alkali saponification, an alkali soluble in the above solvent is preferred and KOH or NaOH are more preferred. The pH of the coating solution for alkali saponification is preferably 10 or higher, more preferably 12 or higher. It is preferable that the alkali saponification is conducted at room temperature for 1 second or longer but not longer than 5 minutes, more preferably 5 seconds or longer but not longer than 5 minutes and particularly preferably 20 seconds or longer but not longer than 3 minutes. After the completion of the alkali saponification, it is preferable to wash the surface coated with the saponification solution with water or wash the surface with an acid followed by waster-washing.

The optical resin film of the invention may be provided with an optically anisotropic layer.

The optically anisotropic layer is made of, for example, a liquid crystal compound, a non-liquid crystal compound, an inorganic compound, an organic/inorganic complex compound, etc. without restriction. As the liquid crystal compound, use can be made of one obtained by orientating a low-molecule compound having a polymerizable group and then fixing the orientation by light or thermal polymerization or one obtained by orientating a liquid crystal high-molecule compound by heating and then fixing the orientation in the glass state by cooling. As the liquid crystal compound, use can be made of those having a disc structure or a rod structure or showing optically biaxial properties. As the non-liquid crystal compound, use can be made of a high molecule having an aromatic ring such as a polyimide or a polyester.

To form the optically anisotropic layer, use can be made of various methods such as coating, deposition, sputtering and so on.

<Polarizing Plate>

Next, a polarizing plate of the invention will be described.

Polarizers for polarizing plates include iodine-based polarizers, dye-based polarizers using a dichroic dye and polyene-based polarizers. A iodine-based polarizer and a dye-based polarizer are generally produced by using polyvinyl alcohol type films.

In the case of using the optical resin film of the invention as a protective film for a polarizing plate, the polarizing plate may be constructed by a usually employed method without specific restriction. A common method comprises treating the obtained optical resin film with an alkali and then laminating on both faces of a polarizer, which has been constructed by dipping a polyvinyl alcohol film in an iodine solution and stretched, by using a completely saponified aqueous polyvinyl alcohol solution. As an alternative for the alkali treatment, use may be made of a treatment for facilitating adhesion as reported in JP-A-6-94915 or JP-A-6-118232. Examples of the adhesive to be used for laminating the treated face of the protective film on the polarizer include polyvinyl alcohol-based adhesives such as polyvinyl alcohol and polyvinyl butyral, vinyl-based latexes such as butyl acrylate, and adhesives or pressure-sensitive adhesives comprising, as the base polymer, an appropriate polymer selected from among acrylic polymers, epoxy-based polymers, denatured olefin-based polymers, styrene/butadiene-based polymers, silicone polymers, polyester, polyurethane, polyether, synthetic rubbers and special synthetic rubbers.

To elevate the adhesiveness, a surface treatment may be conducted. As the specific surface treatment, use can be made of, for example, the corona discharge treatment, the glow discharge treatment, the flame treatment, an acid treatment, an alkali treatment or the UV irradiation treatment. It is also preferable to form an undercoat layer as described in JP-A-7-333433. From the viewpoint of holding the planar properties of the film, it is preferable that the polymer film temperature is maintained at Tg (glass transition temperature) or lower throughout such a treatment.

The polarizing plate is composed of the polarizer, the protective films protecting both faces thereof and a pressure-sensitive adhesive layer located at least one face thereof. Further, it may have a separate film on the pressure-sensitive adhesive layer face and a protect film on the opposite face of the polarizing plate to the separate film. The protect film and the separate film are employed in order to protect the polarizing plate during shipment, product inspection and other steps. In this case, the protect film, which aims at protecting the surface of the polarizing plate, is laminated on the face opposite to the face to be laminated on a liquid crystal plate. On the other hand, the separate film, which aims at covering the pressure-sensitive adhesive layer to be boned to the liquid crystal plate, is laminated on the face of the polarizing plate to be laminated on the liquid crystal face.

The pressure-sensitive adhesive layer is formed by applying a solution of a (meth)acrylic copolymer-containing composition containing a (meth)acrylic copolymer (A) {or a high-molecular weight (meth)acrylic copolymer ($A_1$) with a low-molecular weight (meth)acrylic (co)polymer ($A_2$)} with a polyfunctional compound (B) on the separate film with the use of a coater such as a die coater, drying and then transferring the layer together with the separate film to the polarizing plate-protective film. Alternatively, the solution of the composition as described above may be applied on the polarizing plate-protective film and dried followed by covering with a separate film.

When the perpendicular intersecting accuracy of the slow axis of the optical resin film of the invention and the absorption axis (the axis perpendicularly intersecting the transmission axis) in the polarizer the polarizing plate fabricated under the crossed Nicols is within 1°, the polarization performance under the crossed Nicols is lowered and, in its turn, there arise little troubles such as light leakage or failure in achieving a sufficient black level or contrast when combined with a liquid crystal cell. Accordingly, it is preferable that the deviation between the slow axis direction of the optical resin film of the invention and the transmission axis of the polarizing plate is within 1°, more preferably within 0.5°.

The polarizing plate is bonded to the liquid crystal cell usually by bonding the polarizing plate to a suction device having a large number of holes, stripping off the separate film on the surface of the pressure-sensitive layer having been formed by applying a pressure-sensitive adhesive, bringing the pressure-sensitive layer surface into contact with the liquid crystal cell and then pressing with a roller. When the polarizing plate is curled with facing the concave side to the liquid crystal in this step, suction by the suction device cannot be sufficiently conducted and there arises a deviation in the attachment angle to the suction device. As a result, the bonding angle to the liquid crystal cell is deviated, which makes it impossible to achieve the intended display characteristics. Moreover, the polarizing plate sometimes drops off from the suction device in the course of bonding and thus the attachment cannot be continued any longer, i.e., stopping the procedure.

In order to avoid such failures in bonding the polarizing plate, it is preferable to regulate the curling level of the polarizing plate within a range of −30 mm to +15 mm, more preferably from −20 mm to +5 mm and most preferably from −10 mm to 0 mm. Curling of the film being concave in the face to be bonded to the liquid crystal (the face coated with the pressure-sensitive adhesive the surface of the pressure-sensitive adhesive layer) is referred to as + (plus) curling, while curling being convex is referred to as − (minus) curling. The curling level can be regulated by controlling the relationship among the thickness, modulus of elasticity and the coefficient of humidity expansion of the protective film in the liquid crystal cell side and the protective film in the side opposite to the liquid crystal cell.

It is further preferable that the polarizing plate of the invention has at least one of a hard coat layer, an antiglare layer and an antireflection layer on the surface of the protective film in at least one side of the polarizing plate. In the case of using in a liquid crystal display, namely, it is preferable that the protective film provided in the side opposite to the liquid crystal cell has functional layer such as an antireflection layer. As such a functional film, it is preferable to form at least one layer selected from among a hard coat layer, an antiglare layer and an antireflection layer. It is not necessary to form individual layers separately. That is, it is possible to form an antireflection layer or a hard coat layer also serving as an antiglare layer to thereby give an antiglare and antireflection layer instead of forming two layers, i.e., an antiglare layer and an antireflection layer. Preferred modes of these antiglare films and antireflection films are described in Japan Institute of Invention and Innovation Journal of Technical Disclosure No. 2001-1745 (Mar. 15, 2001, Japan Institute of Invention and Innovation), p. 54 to 57 and the optical resin film of the invention is preferably usable therein.

(Liquid Crystal Display)

The optical resin film or the polarizing plate constructed by boding the optical resin film to a polarizer as described above is advantageously usable in liquid crystal displays, in particular, transmission type liquid crystal displays.

A liquid crystal display of transmission type comprises a liquid crystal cell and two polarizing plates provided in both sides thereof. A polarizing plate comprises a polarizer and two protective films provided in both sides thereof. The liquid crystal cell carries liquid crystal sandwiched between two electrode substrates.

One sheet of the optical resin film of the invention may be provided between the liquid crystal cell and one of the polarizing plates. Alternatively, two sheets thereof may be provided between the liquid crystal cell and each of the polarizing plates.

The polarizing plate of the invention may be used as at least one of the polarizing plates provided in both sides of the liquid crystal cell. In this case, the polarizing plate of the invention is located so that the optical resin film is provided in the liquid crystal side.

It is preferable to use a liquid crystal cell of the VA mode, the OCB mode, the IPS mode or the TN mode.

In a liquid crystal cell of the VA mode, rod-shaped liquid crystal molecules are substantially vertically orientated when no voltage is applied.

Liquid crystal cells of the VA mode include: (1) a VA mode liquid crystal cell in a narrow sense in which rod-shaped liquid crystal molecules are substantially vertically orientated when no voltage is applied, and substantially horizontally orientated when voltage is applied (JP-A-2-176625); (2) a liquid crystal cell of the multidomained VA mode (MVA mode) (SID97, Digest of tech Papers, 28 (1987) 845); (3) a liquid crystal cell in which rod-shaped liquid crystal molecules are substantially vertically orientated when no voltage is applied, and orientated in a twisted multidomain state when voltage is applied (n-ASM mode) (Digest of tech Papers, Nihon Ekisho Toronkai, 58-59 (1998)); and (4) a liquid crystal cell of the survival mode (reported in LCD International 98).

A liquid crystal cell of the OCB mode is a liquid crystal cell of the bend orientation mode in which rod-shaped liquid crystal molecules are orientated substantially oppositely (symmetrically) in the upper part and lower part of the liquid crystal cell. Liquid crystal displays using the bend orientation mode liquid crystal cells are disclosed in U.S. Pat. No. 4,583,825 and U.S. Pat. No. 5,410,422. Since rod-shaped liquid crystal molecules are symmetrically orientated in the upper and lower parts of the liquid crystal cell, the liquid crystal cell of the bend orientation mode has a optically self-compensatory function.

Thus, a liquid crystal cell of this mode is called the OCB (Optically Compensatory Bend) liquid crystal mode. A liquid crystal display of the bend orientation mode is advantageous in a high response speed.

In a liquid crystal cell of the TN mode, rod-shaped liquid crystal molecules are substantially horizontally orientated when no voltage is applied, and further orientated in a direction twisted by 60 to 120°.

Liquid crystal cells of the TN mode, which are most frequently employed in color TFT liquid crystal displays, have been reported in a number of documents.

EXAMPLES

Next, the invention will be illustrated in greater detail by referring Referential Example, Examples and Comparative Example. However, it is to be understood that the invention is not restricted thereto. Unless otherwise noted, all parts and percentages in the following Examples are by mass.

In the following Examples, properties were determined by the methods as follows.

(1) Number-average molecular weight was measured by the GPC method using toluene as a solvent.

(2) Hydrogenation ratio was measured by $^1$H-NMR.

(3) Glass transition temperature (Tg) was measured by the DSC method with the use of a part of an unstretched sheet as a sample.

(4) Retardation was measured by making light having a wavelength of 590 nm incident into the normal line direction in KOBRA 21ADH (manufactured by Oji Science Instruments).

(5) Sheet thickness and film thickness were measured with a dial type thickness gauge.

(6) Light transmittance was measured with a spectrophotometer by continuously changing wavelength within a wavelength range of from 400 to 700 nm and the minimum transmittance was referred to as the light transmittance of a unstretched sheet or a stretched and orientated sheet.

Example 1

(Formation of Film 1) To 60 parts of 6-methyl-1,4,5,8-dimethano-1,4,4a,5,6,7,8,8a-octahydronaphthalene (hereinafter abbreviated as MTD), 10 parts of a 15% cyclohexane solution of triethyl aluminum employed as a polymerization catalyst, 5 parts of triethylamine and 10 parts of a 20% cyclohexane solution of titanium tetrachloride were added. After ring-opening polymerization in cyclohexane, the obtained ring-opened polymer was hydrogenated with a nickel catalyst to give a polymer solution. This polymer solution was solidified in isopropyl alcohol and dried to give a powdery resin. The number-average molecular weight of this resin was 40,000, the hydrogenation ratio thereof was 99.8% or more and Tg thereof was 142° C.

This powdery resin was melted at 250° C. and pelletized. The obtained pellets were melt-extruded from a T-die of 300 mm in width with the use of a uniaxial extruder provided with a 40 nm full flight screw and then wound up with three cooling rolls of 300 mm in diameter to give a film. In this procedure, the resin temperature at the die was 275° C., while the temperatures of the first, second and third rolls were respectively 120° C., 120° C. and 100° C.

Since the unstretched film was uneven in thickness at both ends, the end parts (width: 20 mm) were cut off. When the film surface was observed with the naked eye and under an optical microscope, no foaming, lines or scuff marks were observed. Tg was 139° C., the average thickness was 150 μm, the unevenness in thickness was ±4 μm or less and the light transmittance was 90.5%. When measured at a temperature of 60° C. and a humidity of 95% RH and converted into a film thickness of 80 μm, the vapor transmittance was 13 g/m$^2$·24 h.

(Formation of Film 2)

Pellets of an alicyclic structure-containing polymer resin (ZEONOR 1420, manufactured by ZEON CORPORATION; Tg 135° C., saturated water absorptivity 0.01% or less) were dried at 70° C. for 2 hours by using a ventilated hot-air dryer. Then the pellets were extrusion-molded by using a film melt extruder machine of the T-die type having a resin melt-kneader provided with a screw of 65 mm in diameter at a melted resin temperature of 270° C. and a T-die width of 500 mm to give a film of 100 μm in thickness and 300 mm in length. When measured at a temperature of 60° C. and a humidity of 95% RH and converted into a film thickness of 80 μm, the vapor transmittance was 12 g/m$^2$·24 h.

(Formation of Film 3)

An alicyclic structure-containing polymer resin (ZEONOR 1420, manufactured by ZEON CORPORATION; Tg 135° C., saturated water absorptivity 0.01% or less) was dissolved in methylene chloride to give a solution. To this solution, 2.5 parts by mass, based on the solid matters (solid contents), of a Wavelength dispersion regulator 1 was added. Using this solution, an optical resin film 3 of 120 μm in thickness was obtained by the casting method. When measured at a temperature of 60° C. and a humidity of 95% RH and converted into a film thickness of 80 μm, the vapor transmittance was 10 g/m²·24 h.

Wavelength dispersion regulator 1

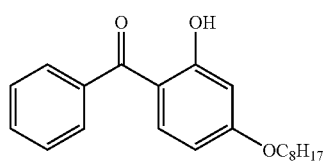

UV-102

(Formation of Film 4)

An alicyclic structure-containing polymer resin (ZEONOR 1420, manufactured by ZEON CORPORATION; Tg 135° C., saturated water absorptivity 0.01% or less) was dissolved in methylene chloride to give a solution. To this solution, 2 parts by mass, based on the solid matters, of a Re expressing agent 1 was added. Using this solution, an optical resin film 4 of 120 μm in thickness was obtained by the casting method. When measured at a temperature of 60° C. and a humidity of 95% RH and converted into a film thickness of 80 μm, the vapor transmittance was 8 g/m²·24 h.

Re expressing agent 1

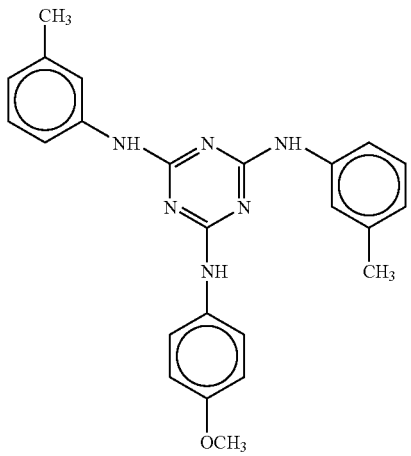

Example 2

The film 1 obtained in Example 1 was freely uniaxially stretched in the traveling direction at 185° C. at a stretching ratio of 15% to give a stretched and orientated film. Table 1 shows the optical performance thereof.

The films 2 to 4 were also stretched under the conditions as specified in Table 1. Table 1 shows the optical performances thus obtained too.

In Tables 1 to 3, the numerical values given in the columns (A) to (D) respectively indicate the following values.

(A) Re(450)/Re(550)
(B) Re(650)/Re(550)
(C) (Re(450)/Rth(450))/(Re(550)/Rth(550))
(D) (Re(650)/Rth(650))/(Re(550)/Rth(550))

TABLE 1

| Film No. | Un-stretched raw film | Stretching temp. (° C.) | Stretching ratio (%) | Thickness (μm) | Re (450) | Re (550) | Re (650) | Rth (450) | Rth (550) | Rth (650) | A | B | C | D | |
|---|---|---|---|---|---|---|---|---|---|---|---|---|---|---|---|
| 2-1 | 1 | 185 | 15 | 120 | 35 | 45 | 55 | 45 | 50 | 55 | 0.778 | 1.222 | 0.864 | 1.111 | Invention |
| 2-2 | 2 | 185 | 25 | 80 | 42 | 55 | 68 | 52 | 60 | 68 | 0.764 | 1.236 | 0.881 | 1.091 | Invention |
| 2-3 | 3 | 200 | 25 | 90 | 65 | 72 | 80 | 67 | 70 | 72 | 0.903 | 1.111 | 0.943 | 1.080 | Invention |
| 2-4 | 4 | 185 | 20 | 95 | 58 | 65 | 72 | 58 | 60 | 63 | 0.892 | 1.108 | 0.923 | 1.055 | Invention |

Example 3

The films 1 to 4 obtained in Example 1 were free-uniaxially stretched in the traveling direction at 185° C. at a stretching ratio of 25%. Next, these films were relieved in the traveling direction at 25% to give stretched and orientated films. Table 2 shows the stretching conditions and optical performances.

TABLE 2

| Film No. | Un-stretched raw film | Stretching temp. (° C.) | Widthwise stretching ratio (%) | Lengthwise relieving ratio (%) | Thickness (μm) | Re (450) | Re (550) | Re (650) | Rth (450) | Rth (550) | Rth (650) | A | B | C | D | |
|---|---|---|---|---|---|---|---|---|---|---|---|---|---|---|---|---|
| 3-1 | 1 | 185 | 25 | 25 | 120 | 48 | 55 | 60 | 125 | 130 | 135 | 0.873 | 1.091 | 0.908 | 1.051 | Invention |
| 3-2 | 2 | 200 | 35 | 30 | 75 | 70 | 75 | 80 | 148 | 150 | 155 | 0.933 | 1.067 | 0.946 | 1.032 | Invention |
| 3-3 | 3 | 190 | 30 | 20 | 95 | 68 | 75 | 83 | 155 | 160 | 165 | 0.907 | 1.107 | 0.936 | 1.073 | Invention |
| 3-4 | 4 | 200 | 30 | 25 | 90 | 60 | 65 | 70 | 131 | 130 | 128 | 0.923 | 1.077 | 0.916 | 1.094 | Invention |

Example 4

(Formation of Orientation Film)

The films (2-1 to 2-4) obtained in Example 2 were subjected to the corona discharge treatment by using a corona discharge treatment apparatus. Next, a diluted solution of steroid-denatured polyamic acid was applied to the corona-discharged face in a thickness of 1 μm. The coating layer was continuously dried in a hot-air stream at 60° C. while controlling so as to give an average treatment time of 2 minutes, thereby giving orientation films that make liquid crystal molecules to be perpendicularly orientated.

Example 5

(Formation of Optically Anisotropic Layer 1)

By using each of the films (2-1 to 2-4) having the orientation films formed in Example 4 which traveled at 20 m/min, a coating solution containing a discotic liquid crystal of the following composition was continuously applied on the orientation film face of the film with a wire bar which was rotated at 391 rpm in the same direction as the traveling direction of the film. Thus, layered films 2-1-D to 2-4-D were obtained. Table 3 shows the number of the wire bar employed for each film and the optical performance after the formation of the liquid crystal layer.

| Composition of coating solution of discotic liquid crystal layer | | |
|---|---|---|
| Discotic liquid crystal compound shown below | 32.6 | mass parts (weight parts) |
| Compound shown below (additive for orientating disc face by within 5°) | 0.1 | mass parts |
| Ethylene oxide-denatured trimethylol propane triacrylate (V#360, manufactured by Osaka Yuki Kagaku K. K.) | 3.2 | mass parts |
| Sensitizer (KAYACURE DETX, manufactured by Nippon Kayaku Co., Ltd.) | 0.4 | mass parts |
| Photopolymerization initiator (IRGACURE 907, manufactured by Ciba-Geigy) | 1.1 | mass parts |
| Methyl ethyl ketone | 62.0 | mass parts |

-continued

Discotic liquid crystal compound

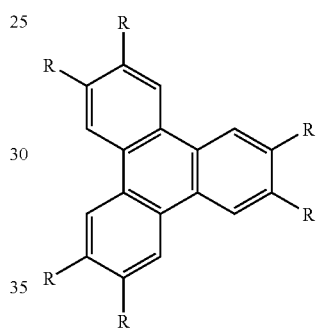

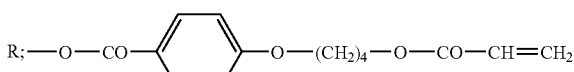

Additive for orientating disc face by within 5°

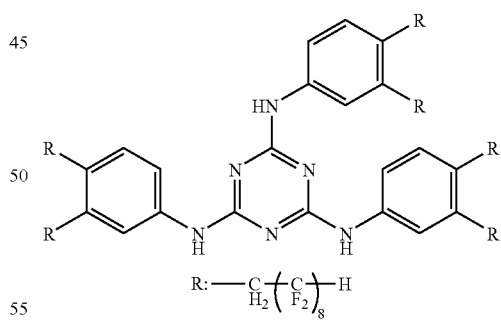

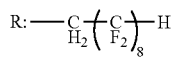

In the course of continuously rising temperature form room temperature to 100° C., the solvent was evaporated. Then the residue was heated in a drying zone at 130° C. in such a manner as giving a film face air speed of the discotic liquid crystal layer of 2.5 m/sec for about 90 seconds to thereby orientate the discotic liquid crystal compound. Next, the crosslinking reaction was promoted by irradiating with UV light at a film surface temperature of about 130° C. with a UV irradiator (UV lamp, output 120 W/cm) for 4 seconds so that the discotic liquid crystal compound was fixed to that state.

Then, it was allowed to cool to room temperature and wound up in a roll. Thus, a rolled optically compensatory film was produced.

The angle between the disc face of the discotic liquid crystal compound and the transparent polymer film face was 0°.

TABLE 3

| Layered film | Film No. | Wire bar No. # | Re (450) | Re (550) | Re (650) | Rth (450) | Rth (550) | Rth (650) | A | B | C | D | |
|---|---|---|---|---|---|---|---|---|---|---|---|---|---|
| 2-1-D | 2-1 | 2 | 35 | 45 | 55 | 145 | 138 | 130 | 0.778 | 1.222 | 0.740 | 1.297 | Invention |
| 2-2-D | 2-2 | 34 | 42 | 55 | 68 | 216 | 206 | 200 | 0.764 | 1.236 | 0.728 | 1.273 | Invention |
| 2-3-D | 2-3 | 34 | 65 | 72 | 80 | 226 | 210 | 210 | 0.903 | 1.111 | 0.863 | 1.143 | Invention |
| 2-4-D | 2-4 | 34 | 58 | 65 | 72 | 216 | 200 | 200 | 0.892 | 1.108 | 0.851 | 1.141 | Invention |

Table 3 header spanning: Optical performance after forming liquid crystal layer

Comparative Example 1

(Formation of film Z1)

Pellets of an alicyclic structure-containing polymer resin (ZEONOR 1420, manufactured by ZEON CORPORATION; Tg 135° C., saturated water absorptivity 0.01% or less) were dried at 70° C. for 2 hours by using a ventilated hot-air dryer. Then the pellets were extrusion-molded by using a film melt extruder machine of the T-die type having a resin melt-kneader provided with a screw of 65 mm in diameter at a melted resin temperature of 270° C. and a T-die width of 500 mm to give a film of 100 μm in thickness and 300 mm in length. The obtained film was uniaxially stretched in the traveling direction at 130° C. and at a stretching ratio of 15% to give a stretched and orientated film.

The average thickness of the stretched and orientated film was 120 μm and the retardation values Re and Rth at a wavelength of 550 nm were respectively 45 nm and 125 nm.

Similarly, the retardation values ($R^e$) measured at wavelengths of 450 nm and 650 nm were respectively 46 nm and 44 nm, while the retardation values (Rth) measured at wavelengths of 450 nm and 650 nm were respectively 127 nm and 122 nm.

That is, the A value was 1.02 and the B value was 0.98. The C value was 1.01 and the D value was 1.00.

(Formation of film Z2)

The composition shown below was poured into a mixing tank and stirred under heating to dissolve individual components. Thus, a cellulose triacetate solution was prepared.

| Composition of cellulose acetate solution | |
|---|---|
| Cellulose acetate with degree of acetylation of 60.9% | 100 mass parts |
| Triphenyl phosphate (plasticizer) | 7.8 mass parts |
| Biphenyl dipheynyl phosphate (plasticizer) | 3.9 mass parts |
| Methylene chloride (solvent 1) | 300 mass parts |
| Methanol (solvent 2) | 45 mass parts |
| Dye (360FP manufactured by Sumitomo Finechem) | 0.0009 mass part |

To another mixing tank, 16 parts by mass of the Wavelength dispersion regulator 1 as described above, 80 parts by mass of methylene chloride and 20 parts of methanol were supplied and the mixture was stirred under heating to thereby prepare a retardation raising agent solution.

464 parts by mass of the cellulose acetate solution of the above composition was mixed with 36 parts by mass of the above retardation raising agent solution and 1.1 parts by mass of silica microparticles (R972 manufactured by Aerosil) and the mixture was thoroughly stirred to give a dope. The retardation expressing agent was added in an amount of 5.0 parts by mass per 100 parts by mass of cellulose acetate. The silica microparticles were added in an amount of 0.15 part by mass per 100 parts by mass of cellulose acetate.

The obtained dope was cast by using a casting machine having a band of 2 m in width and 65 m in length. When the film face temperature on the band attained 40° C., the film was dried for 1 minute and then stripped off. Next, it was stretched at 28% in the width direction by using a tenter in a drying air-stream at 140° C. After drying in a drying air-stream at 135° C. for 20 minutes, a cellulose acylate film Z2 containing 0.3% by mass of the residual solvent was obtained. Tg of the cellulose acylate employed was 140° C.

The width of the cellulose acylate film thus obtained was 1340 mm while the thickness thereof was 92 μm. The retardation value ($R^e$) determined at a wavelength of 550 nm was 50 nm. The retardation value (Rth) determined was 200 nm.

Similarly, the retardation values (Re) measured at wavelengths of 450 nm and 650 nm were respectively 52 nm and 49 nm, while the retardation values (Rth) measured at wavelengths of 450 nm and 650 nm were respectively 204 nm and 198 nm.

That is, the A value was 1.04 and the B value was 0.98. The C value was 1.02 and the D value was 0.99.

Example 6

(Construction of Polarizing Plate)

(Construction of Polarizing Plate 1)

A polyvinyl alcohol (PVA) film having a thickness of 75 μm and a degree of polymerization of 2,400 was allowed to swell in warm water at 30° C. for 40 seconds and then dyed by dipping in an aqueous solution of 0.06% by mass of iodine and 6% by mass of potassium iodide at 30° C. for 60 seconds. Next, it was stretched to give a longitudinal length 5.0 times longer than the original length while dipping in an aqueous solution of 4% by mass of boric acid and 3% by mass of potassium iodide at 40° C. for 60 seconds. Then, it was dried at 50° C. for 4 minutes to give a polarizer.

The film 2-1-D having been already formed, the polarizer as described above, and ZF14 manufactured by ZEON CORPORATION were bonded together via a two-pack urethane-based adhesive to thereby give a polarizing plate 2-1-D-P. As the two-pack urethane-based adhesive, use was made of a mixture of the main agent as shown below with a hardening agent blended at a ratio by mass of main agent/hardening agent of 100/10.

Main agent: a solution of a polyester-based polyurethane resin in ethyl acetate (trade name: WWA-600S, manufactured by NIPPON POLYURETHANE INDUSTRY Co., Ltd.).

Hardening agent: a solution of polyisocyanate in ethyl acetate (trade name: HARDNER 110, manufactured by NIPPON POLYURETHANE INDUSTRY Co., Ltd.).

Using the films 2-2-D to 2-4-D and 3-1 to 3-4, polarizing plates were constructed in the same manner. In the case of a film having a liquid crystal layer formed thereon, the polarizer was bonded to the face in the side opposite to the liquid crystal layer.

Table 4 shows the combinations of protective films in constructing the polarizing plates. In each case, the angles between the absorption axis of the polarizing plate and the slow axis of the protective film provided in the liquid crystal cell side was 90°. Since the slow axes was in the lengthwise direction of the film in some cases and in the widthwise direction in other cases, roll-to-roll bonding could not be applied to some films.

Comparative Example 2

In the case of the film Z1, a polarizer was sandwiched between the film Z1 and ZF14 (manufactured by ZEON CORPORATION) as in the film 2-1-D of Example 6 to give a polarizing plate Z1-P. The angle between the absorption axis of the polarizing plate and the slow axis of the protective film provided in the liquid crystal cell side was 90°.

The film Z2 was treated as follows.

Film Z2 and TD80U (manufactured by FUJI PHOTOFILM Co., Ltd.) were dipped in a 1.5 mol/l aqueous sodium hydroxide solution at 55° C. and then sodium hydroxide was thoroughly washed off with water. Next, the samples were dipped in a dilute (0.005 mol/l) aqueous solution of sulfuric acid at 35° C. for 1 minute and then dipped in water to thereby thoroughly wash off the dilute aqueous sulfuric acid solution. Finally, the samples were sufficiently dried at 120° C.

Then the above-described polarizer was sandwiched between the film Z2 and TD80U (manufactured by FUJI PHOTOFILM Co., Ltd.) having been thus saponified and bonded with the use of a polyvinyl-based adhesive followed by heating at 70° C. for 30 minutes. Next, the laminate was trimmed by 3 cm in the widthwise direction with a cutter to give a polarizing plate Z2-P in the rolled state having an effective width of 1200 mm and a length of 50 m. The angle between the absorption axis of the polarizing plate and the slow axis of the protective film provided in the liquid crystal cell side was 90°.

TABLE 4

| Polarizing plate No. | Protective film in the side opposite to liquid crystal cell Film | Protective film in the side of liquid crystal cell Film | Remarks |
|---|---|---|---|
| 2-1-D-P | ZF14 | 2-1-D | Invention |
| 2-2-D-P | ZF14 | 2-2-D | Invention |
| 2-3-D-P | ZF14 | 2-3-D | Invention |
| 2-4-D-P | ZF14 | 2-4-D | Invention |
| 3-1-P | ZF14 | 3-1 | Invention |
| 3-2-P | ZF14 | 3-2 | Invention |
| 3-3-P | ZF14 | 3-3 | Invention |
| 3-4-P | ZF14 | 3-4 | Invention |
| Z1-P | ZF14 | Z1 | Comparison |
| Z2-P | TD80U | Z2 | Comparison |

Example 7

(Formation of Pressure-Sensitive Adhesive Layer)

(Preparation of Acrylic Polymer Solution)

75 parts by mass of n-butyl acrylate (n-BA), 20 parts by mass of methyl acrylate (MA), 5 parts by mass of 2-hydroxyacrylate (2-HEA), 100 parts by mass of ethyl acetate and 0.2 part by mass of azobisisobutyronitrile (AIBN) were fed into a reactor. After purging the inside of the reactor with nitrogen gas, the reactor was heated to 60° C. in the nitrogen atmosphere under stirring and the reaction was conducted for 4 hours. After 4 hours, 100 parts by mass of toluene, 5 parts by mass of α-methylstyrene and 2 parts by mass of AIBN were added and the mixture was heated to 90° C. and reacted for additional 4 hours. After the completion of the reaction, the mixture was diluted with ethyl acetate to give an acrylic polymer solution having a solid content of 20%. To 100 parts by mass of the solid matters in the polymer solution, an isocyanate-based crosslinking agent (trade name CORONATE L, manufactured by NIPPON POLYURETHANE INDUSTRY Co., Ltd.) was added. Then, the resultant mixture was stirred well to give a pressure-sensitive adhesive composition.

(Construction of Polarizing Plate having Pressure-Sensitive Adhesive)

The pressure-sensitive adhesive was applied to the polarizing plate constructed in the above Example 6.

The pressure-sensitive adhesive composition containing the acrylic polymer solution as described above was applied to a polyester film having been subjected to a stripping treatment to form a pressure-sensitive adhesive layer (thickness: 25 μm). Then, it was transferred to a polarizing plate (on the protective film provided in the cell side) and aged at a temperature of 23° C. and a humidity of 65% for 7 days to give a polarizing plate having the pressure-sensitive adhesive. Moreover, a separate film was bonded to the pressure-sensitive adhesive layer. To the protective film in the side opposite to the cell, a protect film was bonded.

Comparative Example 3

A pressure-sensitive adhesive layer was formed on the polarizing plate constructed in Comparative Example 2 in the same manner as in Example 7 to give a polarizing plate having the pressure-sensitive adhesive. As in Example 7, a separate film and a protect film were also bonded.

Example 8

(Packaging in VA Panel)

The front and back side polarizing plates and a phase contrast plate were taken off from VA mode liquid crystal TV sets (LC-32AD5, manufactured by SHARP Co.). Then, the polarizing plates having the pressure-sensitive adhesive, which had been constructed in Example 7 and Comparative Example 3, and a marketed polarizing plate having no viewing angle compensatory sheet (HLC2-5618, manufactured by SANRITZ Co.) were cut into pieces of 32" (the absorption angle of each polarizing plate being parallel to the edge) and bonded in the combinations listed in Table 5 with the use of a laminator roll.

In this step, the polarizing plates were located so that the absorption axis of the polarizing plate in the viewing side was in the horizontal direction of the panel, the absorption axis of the polarizing plate in the backlight side was in the perpendicular direction of the panel, and the pressure-sensitive adhesive face was in the liquid crystal cell side.

(Viewing Angle Characteristics)

By using a measurement apparatus (EZ-Contrast 160D, manufactured by ELDIM), viewing angles (the scope wherein no tone reversal in the black side occurred at a contrast ratio of 10 or higher) were measured in 8 grades from black display (L1) to white display (L8). Excluding the case using the marketed polarizing plates (pressure-sensitive adhesive thickness: 25 μm) in both sides and the cases using the polarizing plates of Comparative Examples, favorable viewing angle characteristics were obtained in each of the combinations of the polarizing plates of the invention as listed in Table 5.

(Evaluation of Color Shift)

Moreover, color shift in black display was evaluated. The color shift between the black display at an azimuth angle of 0° and a polar angle of 60° and that at an azimuth angle of 45° and a polar angle of 60° was evaluated.

In the cases of using the polarizing plates of Comparative Examples, large color changes arose and an image observed from an oblique direction was colored in red compared with the front image. In each of the combinations of the polarizing plates of the invention as listed in Table 5, on the other hand, little color difference arose between the oblique and front images and favorable color images were obtained.

TABLE 5

| Backlight side polarizing plate Polarizing plate no. | Viewing side polarizing plate Polarizing plate no. | Viewing angle compensatory property* | Color shift in black display** | Remarks |
|---|---|---|---|---|
| 2-1-D-P | 2-1-D-P | A | A | Invention |
| 2-2-D-P | Marketed | A | A | Invention |
| 2-3-D-P | Marketed | A | A | Invention |
| 2-4-D-P | Marketed | A | A | Invention |
| 3-1-P | 3-1-P | A | A | Invention |
| 3-2-P | Marketed | A | A | Invention |
| 3-3-P | Marketed | A | A | Invention |
| 3-4-P | Marketed | A | A | Invention |
| Z1-P | Z1-P | A | C | Comparison |
| Z2-P | Marketed | A | C | Comparison |
| Marketed | Marketed | B | C | Reference |

*A: Viewing angle characteristics presenting polar angles of 80° or more in all directions.
*B: Contrast ratio being 10 or less in some directions within polar angles of 80°.
**A: Not noticeable.
**B: Somewhat noticeable but acceptable.
**C: Highly noticeable and unacceptable.

(Environmental Test)

With respect to viewing angle characteristics and color shift, comparison was made at low-humidity conditions (25° C., 110% RH) and high-humidity conditions (25° C., 80% RH).

In the cases of using the polarizing plates 2-6-D-P and Z2-P having a film of a high vapor transmission rate as the protective film, the display performance varied depending on humidity. In particular, the color tone observed from the front side varied depending on humidity and the change in color tone between the front direction and an oblique direction was enlarged under the high-humidity conditions.

In the case of using other polarizing plates having protective films with low vapor transmission rates, however, neither the display performance nor the color tone varied depending on humidity, i.e., achieving favorable results.

The results shown 5 indicate that use of an optically compensatory sheet fulfilling the following formulae (A) to (D) makes it possible to improve color shift in black display.

$$0.1 < Re(450)/Re(550) < 0.95 \quad (A)$$

$$1.03 < Re(650)/Re(550) < 1.93 \quad (B)$$

$$0.4 < (Re(450)/Rth(450)/Re(550)/Rth(550)) < 0.95 \quad (C)$$

$$1.05 < (Re(650)/Rth(650)/Re(550)/Rth(550)) < 1.9 \quad (D)$$

According to an aspect of the present invention, it is possible to provide an optical resin film having excellent optical characteristics, a polarizing plate having this film and a liquid crystal display showing little color shift in black display.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-236752 filed Aug. 17, 2005, the contents of which are incorporated herein by reference.

What is claimed is:

1. An optical resin film formed from at least one of a polymer and copolymer of a cycloolefin compound, the optical resin film having retardations satisfying formulae (A) to (D):

$$0.1 < Re(450)/Re(550) < 0.95 \quad (A)$$

$$1.03 < Re(650)/Re(550) < 1.93 \quad (B)$$

$$0.4 < (Re(450)/Rth(450)/Re(550)/Rth(550)) < 0.95 \quad (C)$$

$$1.05 < (Re(650)/Rth(650)/Re(550)/Rth(550)) < 1.9 \quad (D)$$

wherein $Re(\lambda)$ indicates an in-plane retardation by nm of the optical resin film with respect to light having a wavelength of $\lambda$ nm; and $Rth(\lambda)$ indicates a thickness-direction retardation by nm of the optical resin film with respect to the light having the wavelength of $\lambda$ nm.

2. The optical resin film according to claim 1, which is a stretched optical resin film.

3. The optical resin film according to claim 2, which is an optical resin film freely uniaxially stretched at an angle of −10 to 10° to a traveling direction thereof.

4. The optical resin film according to claim 2, which is an optical resin film stretched at an angle of 80 to 100° to a traveling direction thereof and relaxed in a traveling direction thereof.

5. The optical resin film according to claim 1, which has an optically anisotropic layer.

6. The optical resin film according to claim 1, which has Re(590) and Rth(590) satisfying formulae (I) and (II):

$$20 \text{ nm} \leq Re(590) \leq 200 \text{ nm} \quad (I)$$

$$70 \text{ nm} \leq Rth(590) \leq 400 \text{ nm}. \quad (II)$$

7. The optical resin film according to claim 1, which has a film thickness of from 10 to 150 μm.

8. A polarizing plate comprising: at least one optical resin film according to claim 1; and a polarizer.

9. The polarizing plate according to claim 8, which has at least one of a hard coat layer, an antiglare layer and an antireflection layer on a surface thereof.

10. A liquid crystal display comprising an optical resin film according to claim 1.

11. The liquid crystal display according to claim 10, which is a VA mode liquid crystal display.

* * * * *